(12) United States Patent
Foschini et al.

(10) Patent No.: US 7,116,722 B2
(45) Date of Patent: Oct. 3, 2006

(54) WIRELESS COMMUNICATION SYSTEM USING MULTI-ELEMENT ANTENNA HAVING A SPACE-TIME ARCHITECTURE

(75) Inventors: Gerard J. Foschini, Sayrerville, NJ (US); Constantinos B. Papadias, Westfeild, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 762 days.

(21) Appl. No.: 09/901,866

(22) Filed: Jul. 10, 2001

(65) Prior Publication Data

US 2002/0142723 A1 Oct. 3, 2002

Related U.S. Application Data

(60) Provisional application No. 60/267,956, filed on Feb. 9, 2001.

(51) Int. Cl.
H04L 1/02 (2006.01)
H03D 1/04 (2006.01)
H03K 6/04 (2006.01)

(52) U.S. Cl. .................. 375/267; 375/346; 375/349
(58) Field of Classification Search ............... 375/261, 375/267, 298, 299
See application file for complete search history.

(56) References Cited

U.S. PATENT DOCUMENTS

| | | | |
|---|---|---|---|
| 6,058,105 A | 5/2000 | Hochwald et al. ........... 370/310 |
| 6,097,771 A * | 8/2000 | Foschini ..................... 375/346 |
| 6,105,158 A | 8/2000 | Chen et al. .................. 714/755 |
| 6,108,386 A | 8/2000 | Chen et al. .................. 375/341 |
| 6,127,971 A * | 10/2000 | Calderbank et al. ......... 342/368 |
| 6,161,210 A | 12/2000 | Chen et al. .................. 714/786 |
| 6,292,917 B1 * | 9/2001 | Sinha et al. ................. 714/752 |
| 6,351,499 B1 * | 2/2002 | Paulraj et al. ............... 375/267 |
| 6,389,000 B1 * | 5/2002 | Jou ............................. 370/342 |
| 6,424,678 B1 * | 7/2002 | Doberstein et al. ......... 375/260 |
| 6,442,214 B1 * | 8/2002 | Boleskei et al. ............. 375/299 |
| 6,452,981 B1 * | 9/2002 | Raleigh et al. .............. 375/299 |

(Continued)

FOREIGN PATENT DOCUMENTS

EP 0486729 A 11/1990

(Continued)

OTHER PUBLICATIONS

Wong, K.-K et al: "Adaptive Spatial-Subcarrier Trellis Coded MQAM and Power Optimization for OFDM Transmission§" VTC 2000-Spring. 2000 IEEE 51$^{st}$. Vehicular Technology Conference Proceed. Tokyo, Japan, May 15-18, 2000, vol. 3 of 3. Conf. 51, pp. 2049-2053, May 15, 2000.

(Continued)

*Primary Examiner*—Emmanuel Bayard
*Assistant Examiner*—Lawrence B. Williams

(57) ABSTRACT

A method and apparatus for increasing the capacity of a multiple-input and/or multiple-output system. Each sub-stream of a primary data stream is stratified to produce a processed sub-stream whose strata can be separated out and decoded with an acceptable error rate. A sub-stream can be stratified by dividing it into a plurality of sub-stream-components that are processed to obtain strata, with each stratum representing one of the sub-stream-components. The strata are then combined to obtain the processed sub-stream. Stratifying allows a particular processed sub-stream's strata have different transmit features from each other, such as different bit rates, or different power levels, or both. This reduces the interference for some of the strata of each processed sub-stream since as stratum are separated out and decoded they are no longer interference for the other strata. Thus, allowing for a higher overall bit rate for the processed sub-streams.

51 Claims, 11 Drawing Sheets

U.S. PATENT DOCUMENTS

| | | | |
|---|---|---|---|
| 6,466,610 B1* | 10/2002 | Schilling | 375/141 |
| 6,470,043 B1* | 10/2002 | Lo et al. | 375/144 |
| 6,473,467 B1* | 10/2002 | Wallace et al. | 375/267 |
| 6,693,976 B1* | 2/2004 | Hassibi et al. | 375/299 |
| 6,711,412 B1* | 3/2004 | Tellado et al. | 455/506 |
| 6,865,237 B1* | 3/2005 | Boariu et al. | 375/295 |
| 6,891,897 B1* | 5/2005 | Bevan et al. | 375/265 |
| 6,898,248 B1* | 5/2005 | Elgamal et al. | 375/259 |
| 6,922,445 B1* | 7/2005 | Sampath et al. | 375/267 |
| 2002/0154705 A1* | 10/2002 | Walton et al. | 375/267 |
| 2003/0021355 A1* | 1/2003 | You | 375/267 |
| 2003/0043928 A1* | 3/2003 | Ling et al. | 375/267 |
| 2004/0032910 A1* | 2/2004 | Horng et al. | 375/267 |

FOREIGN PATENT DOCUMENTS

| | | | |
|---|---|---|---|
| EP | 0817401 A | 1/1998 | |

OTHER PUBLICATIONS

A. F. Naguib, et al. "Applications of Space-Time Block Codes and Interference Suppression for High Capacity and High Data Rate Wireless Systems", Signals, Systems & Computers, 1998. Conference Record of the Thirty-Second Asilomar Conference on Pacific Grove, CA, USA, IEEE, ISBN: 0-7803-5148-7, pp. 1803-1810, Nov. 1, 1998.

X. Cai, et al., "Multicarrier CDMA Systems with Transmit Diversity" IEEE Vehicular Technology Conference, U.S. vol. 6 of 6, Conf. 52, pp. 2817-2821, Sept. 24, 2000.

European Patent Application Search for EP 02 25 0566.3-1237, The Hague, Apr. 26, 2002.

G. J. Foschini et al., "On Limits of Wireless Communications in a Fadaing Environment When Using Multiple Antennas", Wireless Personal Communications, vol. 6, 1998, pp. 311-335.

A. J. Paulraj et al., "Space-Time Processing for Wireless Communications", IEEE Signal Processing Magazine, 1053-5888/97, pp. 49-83.

U. Wachsmann et al., "Exploiting the Data-Rate Potential of MIMO Channels: Multi-Stratum Space-Time Coding", VTC 2001, Athens Greece, May 7-10.

* cited by examiner

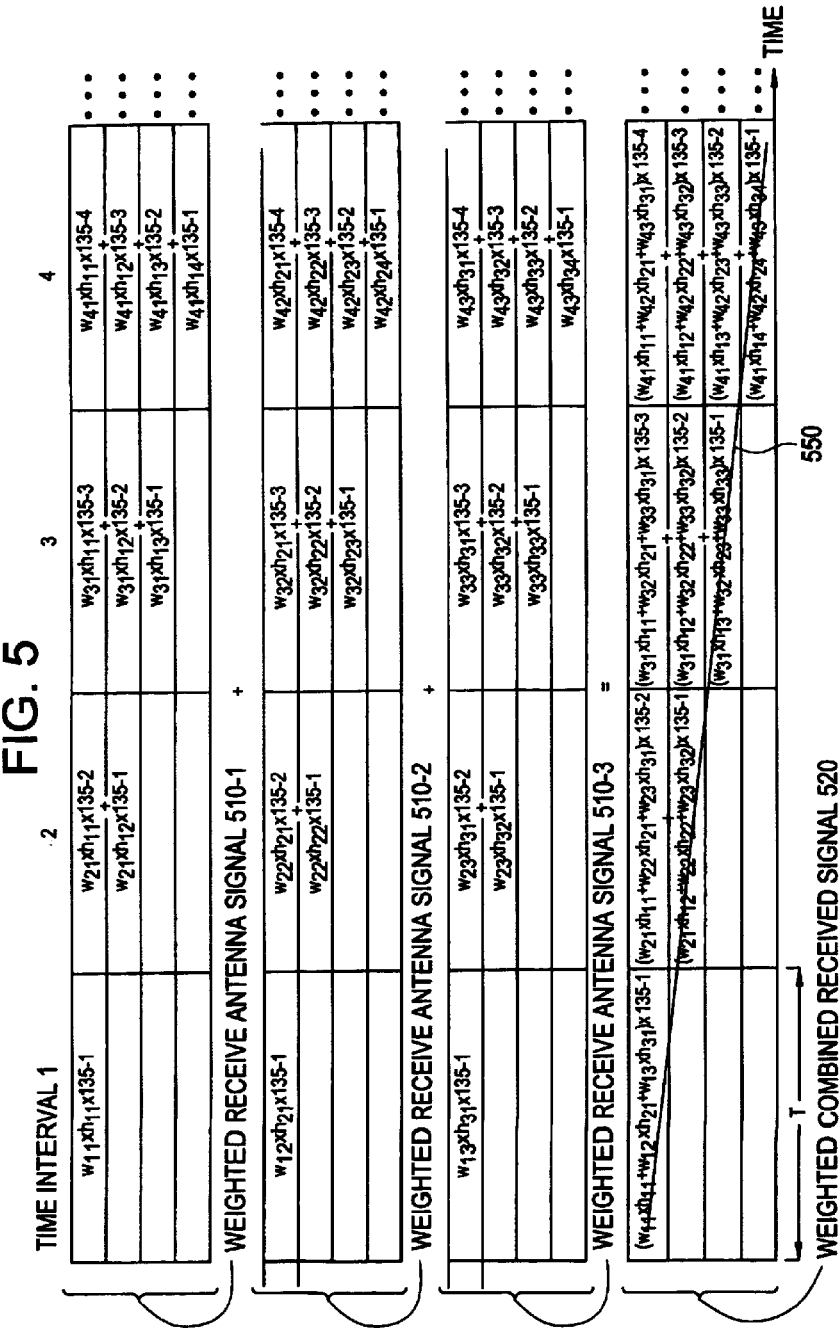

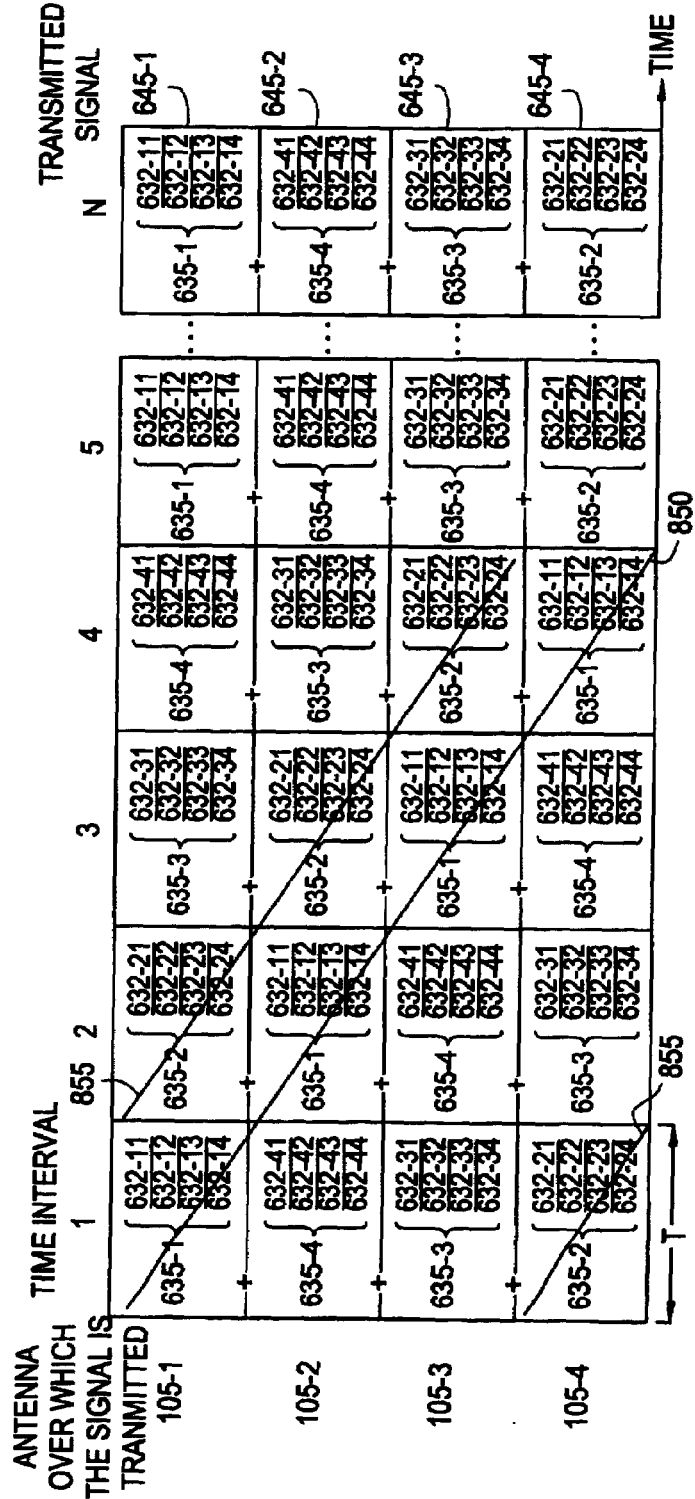

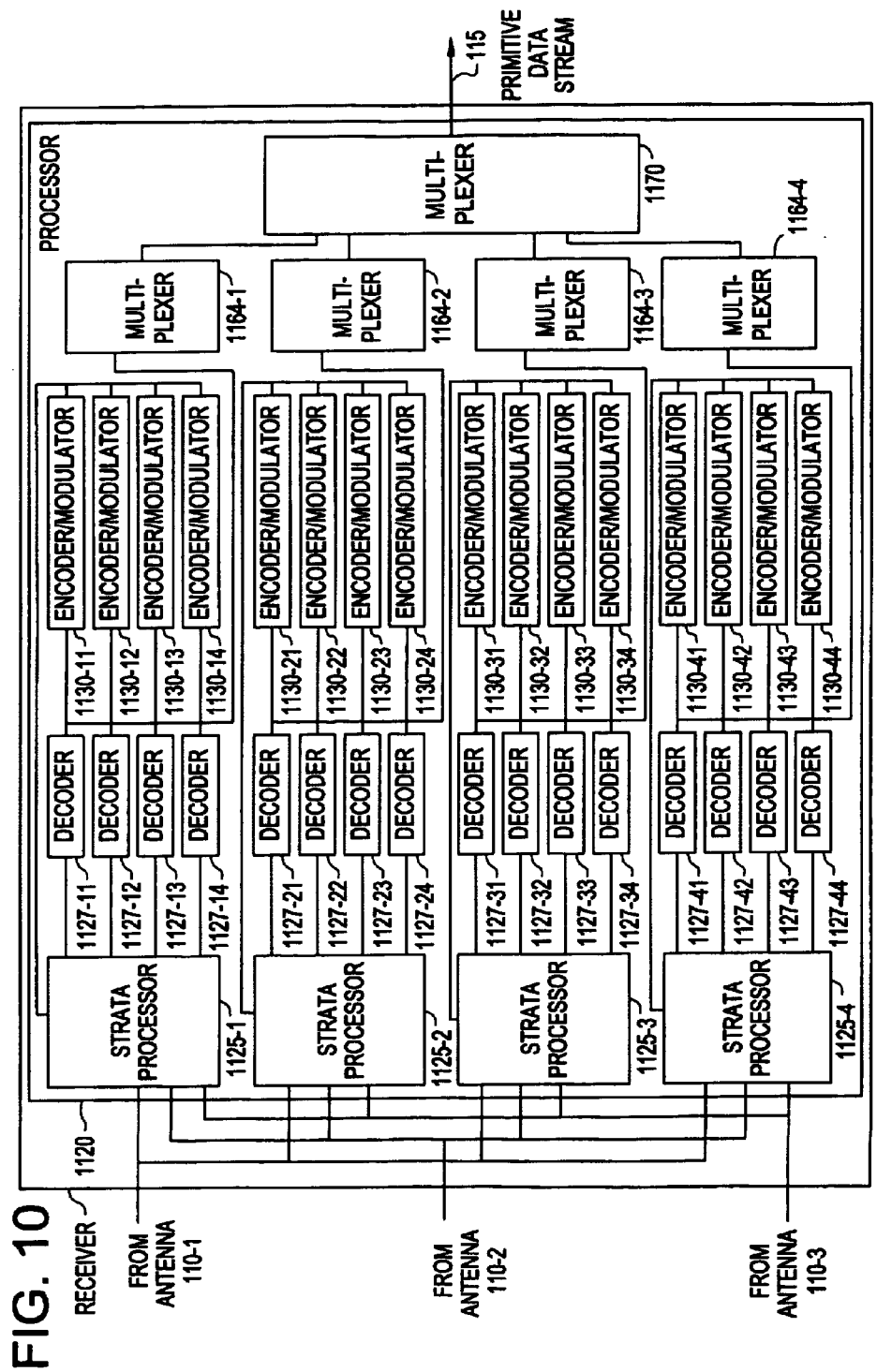

WIRELESS COMMUNICATION SYSTEM USING MULTI-ELEMENT ANTENNA HAVING A SPACE-TIME ARCHITECTURE

CROSS-REFERENCE TO RELATED APPLICATION

This application claims priority of Provisional Application Ser. No. 60/267,956, which was filed on Feb. 9, 2001.

BACKGROUND OF THE INVENTION

This invention relates to wireless communication systems and, more particularly, to wireless communication systems using multiple antennas at the transmitter and/or multiple antennas at the receiver.

The error free maximum information rate at which a communication system may communicate data, i.e., the capacity of the communication system, is governed by Shannon's formula. This maximum information rate is referred to as the Shannon limit. Wireless communication systems that use multiple antennas at the transmitter and optionally multiple antennas at the receiver, so-called multiple-input and/or multiple-output systems, can achieve dramatically improved capacity compared to single antenna systems, i.e., single antenna to single antenna systems. In random scattering propagation environments increasing the number of antennas at the receiver or at the transmitter (or both) produces a larger Shannon limit, i.e. a larger error free maximum information rate.

In multiple-input systems, a primitive data stream—the bits to be transmitted—is divided into a plurality of sub-streams, each of which is processed and transmitted. Each processed sub-stream can be transmitted over a respective different transmit antenna. It is often preferred, however, to cycle the processed sub-streams over all of the antennas so that successive segments of each processed sub-stream are transmitted over different ones of the transmit antennas cyclically.

The signals emanating from each transmit antenna arrive at each receive antenna. Thus, the received signal at each of the receive antennas (regardless of whether there are one or many receive antennas, the latter being a multiple-output system) is a superposition of each of the transmitted signals as modified by the channel characteristics. Even though the transmitted signals interfere with each other in each receive antenna signal, the received signals can be processed to separate the transmitted signals from one another and each separated-out signal can then be decoded to recover the respective sub-streams.

In particular, each of the transmitted signals needs to be received with a signal-to-noise ratio that is high enough to allow it to be sufficiently separated from the others so that its respective sub-stream can thereafter be decoded with an acceptable error rate. To this end, different combined-weighted-(remaining)-received-signals of receive antenna signals can be formed, the weights used to form any particular combination being such as to maximize the signal-to-noise ratio of a respective one of the transmitted signals. (See, for example, G. J. Foschini and M. J. Gans, "On Limits of Wireless Communications in a Fading Environment When Using Multiple Antennas," Wireless Personal Communications, 6 Kluwer Academic Publishers, 1998, pp. 311–335, incorporated herein by this reference.) Even so, in order to get a high enough signal-to-noise ratio, the transmitted signals still have to be transmitted at either 1) a relatively low bit rate, or 2) some of the signals have to be transmitted at a relatively high power level. In the former case, this would reduce the overall bit rate of the primary data stream, and in the latter case, it would increase the overall power level of the primary data stream.

One advantageous method of implementing a multiple-input and/or multiple-output system that increases the primary data stream's bit rate without having to increase the power level, and thus increases the capacity of the system, involves staggering the start of the transmission of signals that represent the sub-streams. Thus, in a first time interval just one signal, representing just one sub-stream, is transmitted. In a second time interval this signal continues to be transmitted and the transmission of another signal, representing another sub-stream is begun, and so forth until all of the signals representing all of the sub-streams are being transmitted.

Thereafter, the receive antenna signals are processed to decode so-called layers of one of the signals that represents a respective one of the sub-streams. A layer is a portion of such a signal representing a particular sub-stream, such that the layer can be decoded with reference to only the symbols in the layer. The symbols representing a block code codeword, for example, can constitute a layer.

In particular, as described in more detail below, the receive antenna signals received over several time intervals are weighted with sets of weights to maximize the signal-to-noise ratio of one of the signals, representing a respective one of the sub-streams. The weighted receive antenna signals are combined and the resulting combined-weighted-received-signal is preprocessed to decode one layer of the signals. The decoded layer is re-encoded, reconstructed in the form that it was received by the receive antennas, and subtracted from the receive antenna signal, to produce the remaining receive antenna signals. The remaining receive antenna signals are then weighted with sets of weights to maximize the signal-to-noise ratio of another of the signals, representing another one of the sub-streams. These weighted remaining receive antenna signals are combined. The result is then preprocessed to decode one layer of the other signal. The decoded layer is re-encoded, reconstructed in the form that it was received by the receive antennas, and subtracted from the remaining receive antenna signal, and so on.

The just described decoding process takes advantage of the fact that during the first time interval only the signal representing one sub-stream is transmitted. Thus, there is no interference from signals representing the other sub-streams. As a result, during the first time interval the only transmitted signal has a relatively high signal-to-noise ratio. Assuming appropriate coding prior to transmission, this relatively high signal-to-noise ratio enables the first layer of this signal to be decoded with an acceptable error rate notwithstanding the presence in later time intervals of interference caused by layers of other signals. The decoded layer is then re-encoded and used to reconstruct the layer in the form that it was received by the receive antennas. The reconstructed first layer is then subtracted out of the receive antenna signals, eliminating it as source of interference for other layers.

The decoding of subsequent layers is carried out by subtracting from the receive antenna signals any already decoded and reconstructed layers, and treating the interference from the layers that have not been decoded as added noise. After a layer of a particular transmitted signal is decoded with an acceptable error rate it can then be re-encoded and subtracted from the remaining receive antenna signals—the receive antenna signals remaining after previously decoded layers have been subtracted from it. This process eliminates the decoded layer as source of interference for other layers. This process is repeated until all the layers of all of the signals are decoded. This approach allows for an increased bit rate because prior to separating out a particular layer the interference of other layers is removed for at least some of the particular layer. See, for example, U.S. Pat. No. 6,097,771 entitled "Wireless Communications System Having A Layered Space-Time Architecture Employing Multi-Element Antennas," hereby incorporated by reference.

SUMMARY OF THE INVENTION

Disadvantageously, use of the staggered startup process described above means that there is some time at the start and end of each burst when there is no data transmitted on some of the antennas, leading to a reduction in the bit rate. Thus in practice reducing the bit rate of the system.

The present invention provides a technique that allows for an increase in the bit rate of a multiple-input and/or multiple-output system. According to the present invention, each sub-stream is stratified to produce a processed sub-stream whose strata can be separated out and decoded with an acceptable error rate. Typically, each processed sub-stream represents a particular sub-stream. A sub-stream can be stratified by, for example, dividing it into a plurality of sub-stream-components that are processed to obtain strata, with each stratum representing one of the sub-stream-components. The strata are then combined to obtain the processed sub-stream and at least a portion of the processed sub-stream components is transmitted. In an illustrative embodiment of the invention the portion of the processed sub-stream is transmitted for the entire duration of a signal burst, i.e. from the start of a signal burst until the end of the signal burst.

Stratifying allows a particular processed sub-stream's strata to be transmitted with different transmit features from each other, such as different bit rates, or different power levels, or both. This reduces the interference for some of the strata of each processed sub-stream since as strata are separated out and decoded they are no longer interference for the other strata. Thus, stratifying allows for a higher overall bit rate for the processed sub-streams. Stratifying also allows for a startup process that starts transmission concurrently on many, or even all, antennas without having to stagger the start of the transmission, while still allowing the processed sub-stream to be decoded with an acceptable error rate and still keeping the overall bit rate of the processed sub-stream relatively high.

In one illustrative embodiment, the bit rates of the strata of a particular processed sub-stream representing a particular sub-stream are ranged from lower to higher. At least a portion of the stratum with the lowest rate is first separated out from a combined received signal and decoded with an acceptable error rate. Because its bit rate is relatively low due to high interference, a portion of this stratum can be separated out and decoded with an acceptable error rate, even in the presence of interference from the other strata across the entire layer, i.e., even though there is no staggering. The separated out portion of the stratum is then re-encoded and used to reconstruct the portion of the stratum in the form that it was received by the receive antennas. It is then subtracted from the receive antenna signals, eliminating it as a source of interference for the rest of the strata. This allows a portion of a stratum with a higher bit rate to then be separated (due to the reduction in interference), decoded with an acceptable error rate, reconstructed, and subtracted from the remaining receive antenna signals. This further reduces the interference for the rest of the strata, allowing a portion of a stratum with an even higher bit rate to be separated, decoded with an acceptable error rate, reconstructed, and subtracted from the remaining receive antenna signals. This process continues until all of the strata, and therefore all of the sub-stream-components, are decoded. Ranging the bit rates of the strata of a particular processed sub-stream, representing a particular sub-stream, from a lower to higher bit rate produces an overall bit rate for the processed sub-stream that is closer to the higher bit rate than to the lower bit rate. Thus, for burst of a limited duration—one that does not approach the theoretical burst of infinite duration hypothesized in the Shannon formula—the processed sub-stream's bit rate is higher than if the signal was transmitted without stratification, and in practice the bit rate is higher than if a staggered startup process was used.

Similarly, in another illustrative embodiment, the power levels of the strata of a processed sub-stream, representing a particular sub-stream, are ranged from higher to lower. At least a portion of the stratum with the highest power level is first separated out, decoded with an acceptable error rate, reconstructed, and subtracted from the receive antenna signals. This allows a portion of a stratum with a lower power level to then be separated, decoded with an acceptable error rate, reconstructed, and subtracted from the remaining receive antenna signals. This process continues until all of the strata, representing all the sub-stream-components, are decoded. For bursts of a limited duration, ranging the power level of a particular processed sub-stream's strata produces in practice a higher bit rate than that produced if a staggered startup process was used. Additionally, although a system that ranges the power level of the strata may be more complicated to design than a system that ranges the bit rates, the former allows for a greater uniformity of design.

Optionally, in a third illustrative embodiment, both the bit rates and the power levels of a particular processed sub-stream's strata are ranged, such as, for example, from lower to higher and higher to lower, respectively. Optimal bit rates and power levels may be selected to increase the maximum bit rate of the overall processed sub-stream, and thus increase the overcall capacity of the system.

BRIEF DESCRIPTION OF THE DRAWINGS

FIG. 5 illustrates the weighting and combining of the receive antenna signals of FIGS. 4*a* through 4*c* into a particular combined-weighted-(remaining)-received-signal;

FIG. 8 illustrates the signals transmitted on the transmit antenna of the system of FIG. 1 that uses the transmitter of FIG. 6;

FIG. 10 illustrates a receiver in accordance with the present invention for use in the multiple-input, multiple-output system of FIG. 1.

DETAILED DESCRIPTION

As described above, wireless communication systems that use multiple antennas at the transmitter and optionally multiple antennas at the receiver, so-called multiple-input and/or multiple-output systems, can achieve dramatically improved capacity—error free maximum information rate—compared to single antenna systems, i.e., single antenna to single antenna systems. In random scattering propagation environments increasing the number of antennas at the receiver or at the transmitter (or both) produces a larger Shannon limit, i.e. a larger error free maximum information rate.

Figure 1:
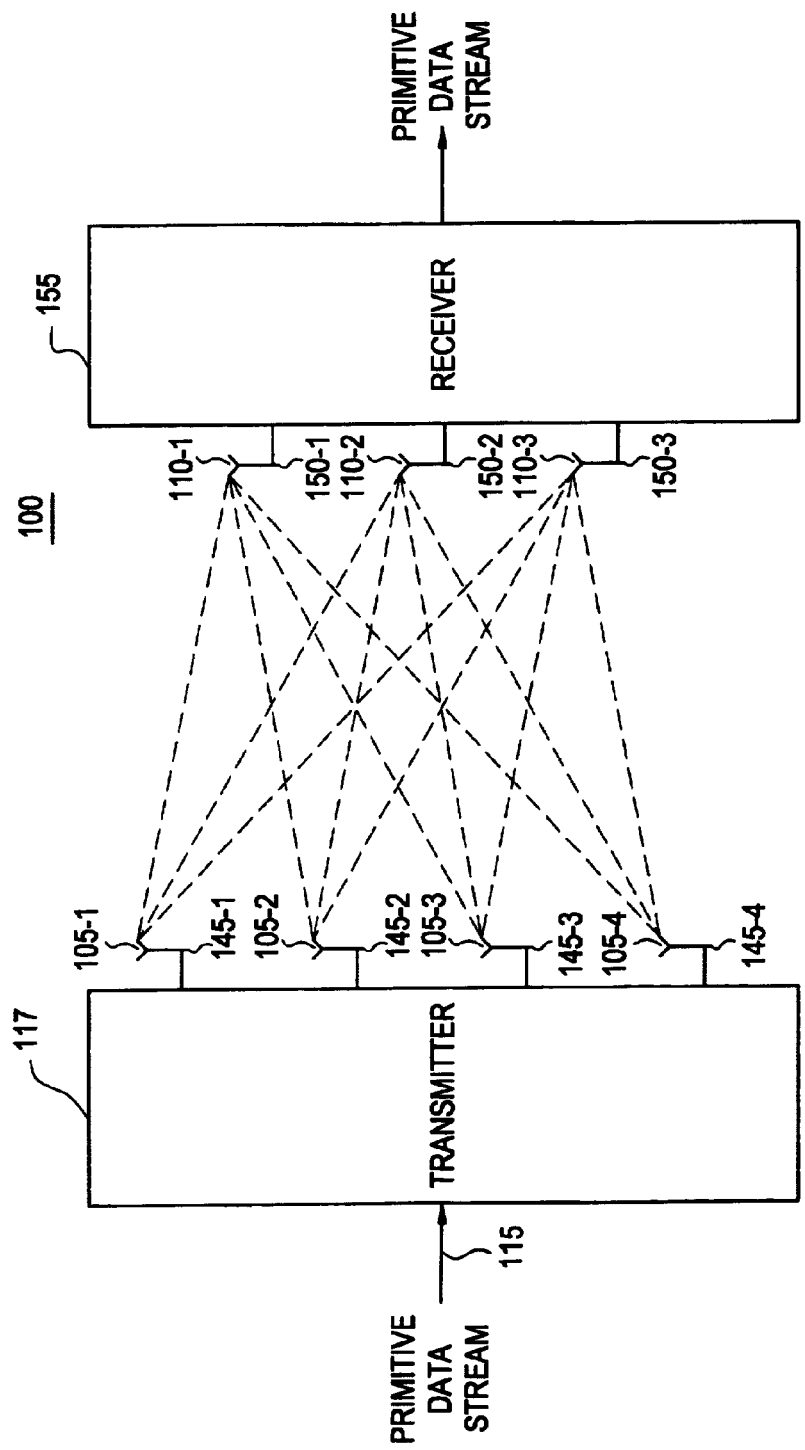
FIG. 1 illustrates a portion of a multiple-input, multiple-output wireless communication system.

FIG. 1 illustrates multiple-input, multiple output wireless communication system 100 having four transmit antennas 105-1, 105-2, 105-3, and 105-4 and three receive antennas 110-1, 110-2, and 110-3. (Although, system 100 will be discussed as having a particular number of transmit and receive antennas, it is to be understood that system 100 may be implemented with any number of transmit and receive antennas.) In system 100, primitive data stream 115—the bits to be transmitted—is supplied to transmitter 117.

Figure 2:
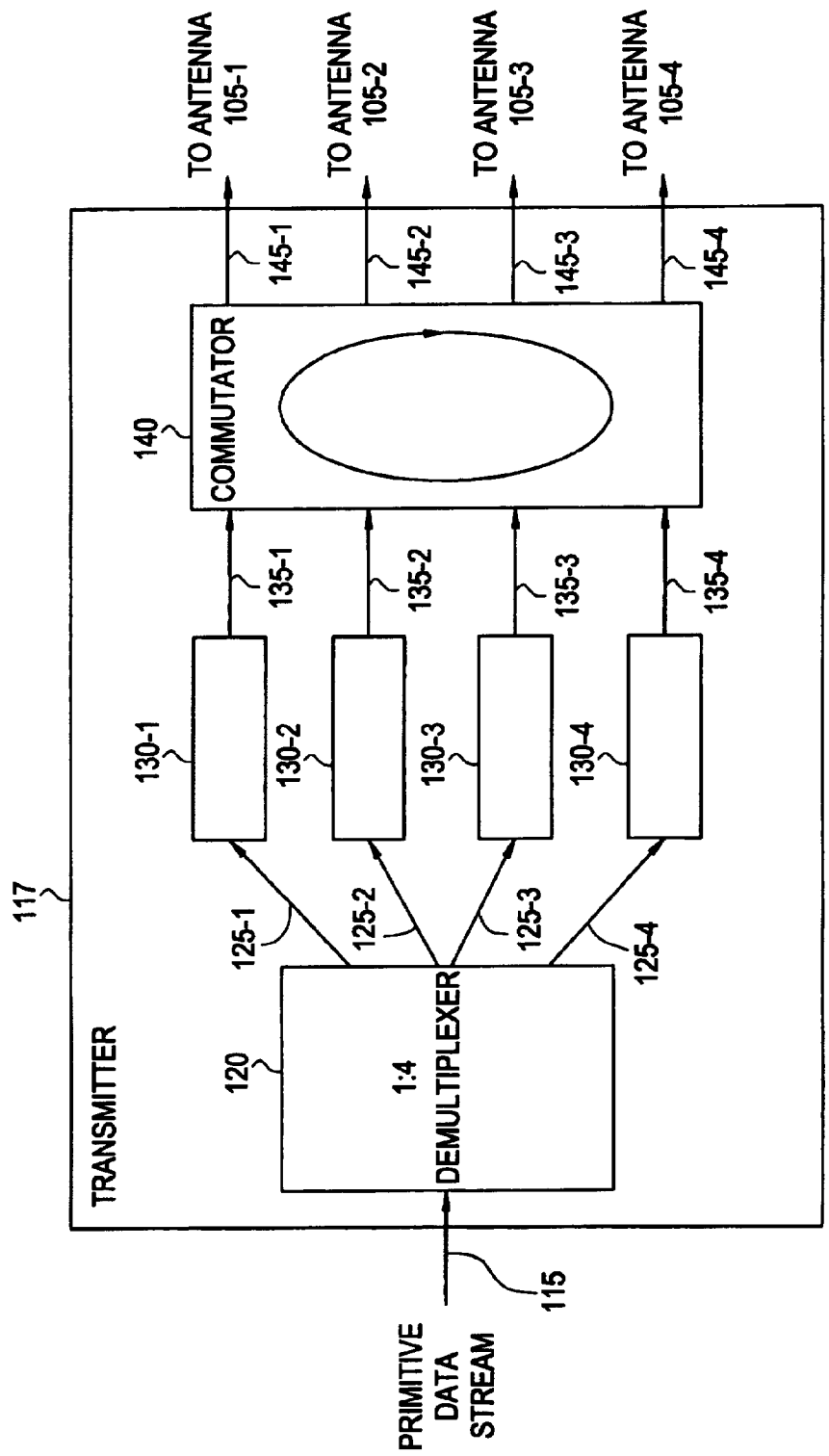
FIG. 2 illustrates in more detail a transmitter for use in the multiple-input, multiple-output system of FIG. 1.
Figure 3:
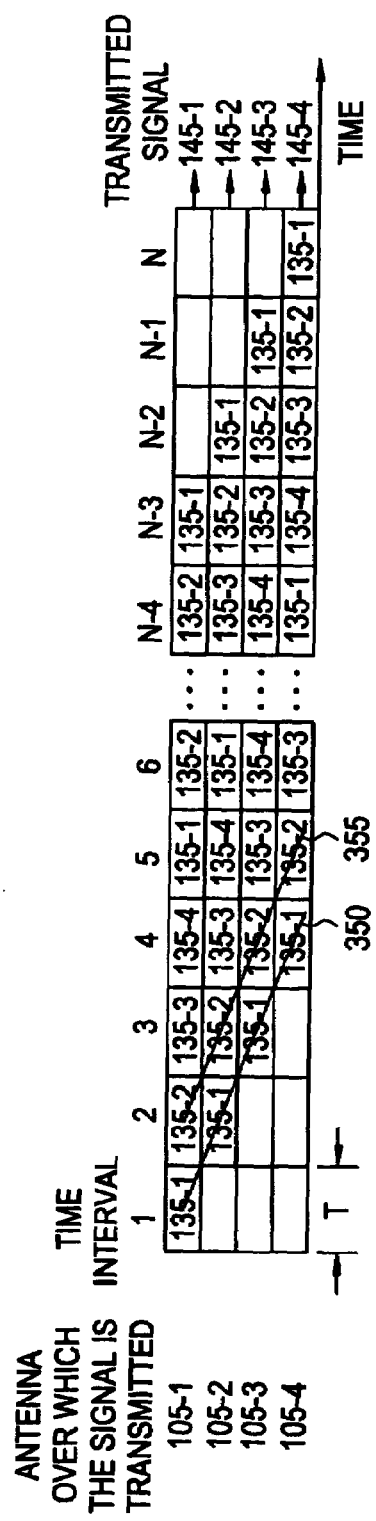
FIG. 3 illustrates the signals transmitted on the transmit antennas of the system of FIG. 1 that uses the transmitter of FIG. 2.

FIG. 2 shows transmitter 117 in more detail. Transmitter 117 receives primitive data stream 115 and demultiplexes it in demultiplexer 120 into a plurality of sub-streams 125-1, 125-2, 125-3, and 125-4, which typically have the same bit rate. Typically, the number of sub-streams equals the number of transmit antennas, so that at some point in time there is a sub-stream being transmitted on each of the transmit antennas. Each sub-stream 125-1, 125-2, 125-3, and 125-4 is processed in respective circuitry, such as encoder/modulator 130-1, 130-2, 130-3, and 130-4, to produce signals 135-1, 135-2, 135-3, and 135-4 each representing a respective sub-stream 125-1, 125-2, 125-3, and 125-4. Each signal 135-1, 135-2, 135-3, and 135-4 can then be transmitted over a respective different transmit antenna. Preferably, however, as shown in FIG. 2 the signals 135-1, 135-2, 135-3, and 135-4 are cycled via commutator 140 over all of the transmit antennas so that successive segments of each signal are transmitted over different ones of the transmit antennas cyclically. The signals 135-1, 135-2, 135-3, and 135-4 thus share a balanced presence over the transmission paths between the transmit and receive antennas. These transmission paths are shown in FIG. 1 and are referred to herein as channels. Because the signals share a balanced presence over the channels, none of the individual signals, and thus none of the sub-streams represented by these signals, is continuously subjected to the worst of the paths. This means that as time goes on and each of the signals 135-1, 135-2, 135-3, and 135-4 is cycled over the transmit antennas, transmitted signals 145-1, 145-2, 145-3, and 145-4 emanating from transmit antennas 105-1, 105-2, 105-3, and 105-4, respectively, include segments of different signals 135-1, 135-2, 135-3, and 135-4, and thus segments of different sub-streams 125-1, 125-2, 125-3, and 125-4, respectively, represented by these signals. For example, as can be seen in FIG. 3, during the first time interval, transmitted signal 145-1, transmitted over antenna 105-1, is signal 135-1, during the second time interval it is signal 135-2, and during the third time interval it is signal 135-3, etc.

There is a channel between each of the transmit and receive antennas. Each channel has its own channel characteristic. These channel characteristics can be represented by a complex matrix H, $$H = \begin{bmatrix} h_{11} & h_{12} & h_{13} & h_{14} \\ h_{21} & h_{22} & h_{23} & h_{24} \\ h_{31} & h_{32} & h_{33} & h_{34} \end{bmatrix} \quad (1)$$

where the $h_{nm}{}^{th}$ entry, n=1, 2, 3 and m=1, 2, 3, 4 represents the channel characteristics between the $n^{th}$ receive antenna and the $m^{th}$ transmit antenna. The channel characteristics may be determined by receiver 155 during a training phase during which known signals are transmitted on each transmit antenna 105-1 through 105-4. These known signals are processed at receiver 155 to provide accurate estimates of the channel characteristics, i.e. the $h_{nm}$'s, of the channels between the transmit and receive antennas. The channel characteristics change over time and, therefore, there is typically a training phase at the start of each burst.

Each of the transmitted signals 145-1, 145-2, 145-3, and 145-4 arrives at each receive antenna 110-1, 110-2, and 110-3. Thus, the received signal 150-1, 150-2, and 150-3 at each of the receive antennas (regardless of whether there are one or many receive antennas) is a superposition of each of the transmitted signals 145-1, 145-2, 145-3, and 145-4 as modified by the channel characteristics, the plus noise vector η, making the receive antenna signals:

$$150\text{-}1 = h_{11} \times 145\text{-}1 + h_{12} \times 145\text{-}2 + h_{13} \times 145\text{-}3 + h_{14} \times 145\text{-}4 + \eta_1 \quad (2)$$

$$150\text{-}2 = h_{21} \times 145\text{-}1 + h_{22} \times 145\text{-}2 + h_{23} \times 145\text{-}3 + h_{24} \times 145\text{-}4 + \eta_2 \quad (3)$$

$$150\text{-}3 = h_{31} \times 145\text{-}1 + h_{32} \times 145\text{-}2 + h_{33} \times 145\text{-}3 + h_{34} \times 145\text{-}4 + \eta_3 \quad (4)$$

Even though the transmitted signals 145-1, 145-2, 145-3, and 145-4 interfere with each other in each receive antenna signal, the latter can be processed to separate the transmitted signals, and therefore signals 135-1, 135-2, 135-3, and 135-4 from one another. Each separated-out signal can be decoded to recover the respective sub-streams 125-1, 125-2, 125-3, and 125-4, which would then be added together to get the primitive data stream.

Each transmitted signal 145-1, 145-2, 145-3, and 145-4 is received with a signal-to-noise plus interference ratio, where the interference includes interference from concurrently transmitted signals. For ease of reference the signal-to-(noise plus interference) power ratio will be referred to throughout as the signal-to-noise ratio. Each transmitted signal 145-1, 145-2, 145-3, and 145-4 needs to be received with a signal-to-noise ratio that is high enough to allow it to be sufficiently separated from the others that the sub-streams 125-1, 125-2, 125-3, and 125-4 can thereafter be decoded with an acceptable error rate. The type of information represented by the primary data stream and the desired use of this information determines a maximum tolerable acceptable error rate. For example, if the information represented by the primary data stream is voice, an acceptable error rate may be 1%; and if that information is sensitive financial data, then an acceptable error rate may be 0.001%. Furthermore, the acceptable error rate may be fine-tuned as a tradeoff between the desire to increase the quality of the signal and the desire to increase the bit rate of the system.

To be able to separate out and decode the sub-streams, different combined-weighted-(remaining)-received-signals of receive antenna signals can be formed, the weights used to form any particular combination being such as to maximize the signal-to-noise ratio of a respective one of the signals 135-1, 135-2, 135-3, and 135-4. (See, for example, G. J. Foschini and M. J. Gans, "On Limits of Wireless Communications in a Fading Environment When Using Multiple Antennas," Wireless Personal Communications, 6 Kluwer Academic Publishers, 1998, pp. 311–335.) For example, at a particular time, a set of weights $w_{11}$, $w_{12}$, and $w_{13}$ can be used to maximize the signal-to-noise ratio of signal 135-1, the weights would be applied to the receive antenna signals, which would then be combined to form combined-weighted-(remaining)-received-signal $w_{11} \times \mathbf{150\text{-}1} + w_{12} \times \mathbf{150\text{-}2} + w_{13} \times \mathbf{150\text{-}3}$. A different set of weights $w_{21}$, $w_{22}$, and $w_{23}$ can be used to maximize the signal-to-noise ratio of another signal 135-2 transmitted at the same time.

At a particular time the weights emphasize the contribution of a particular transmitted signal—from a particular transmit antenna—in the combined-weighted-(remaining)-received-signal and attempt to relegate to a noise-like status the contribution of the other transmitted signals. In this way, the weights are used so that the combined-weighted-(remaining)-received-signal is made to closer resemble the particular transmitted signal. This allows the particular transmitted signal to be separated out and decoded from the combined-weighted-(remaining)-received-signal if either 1) the particular signal is at an appropriate bit rate or power level or 2) additional manipulation, such as the staggered startup process, is used. The particular transmitted signal is then used to detect the bits of the sub-stream represented by this transmitted signal. The particular transmitted signal is then re-encoded and subtracted from the combined-weighted-(remaining)-received-signals that are to be used to decode the other transmitted signals, to reduce the interference for the other transmitted signals.

Unfortunately, even with the use of weights, in order for the signals to be received with a high enough signal-to-noise ratio to be able to decode the signal with an acceptable error rate the signals still have to be transmitted at either 1) a relatively low bit rate, or 2) some of the signals have to be transmitted at a relatively high power level. In the former case, this would reduce the overall bit rate of the primary data stream, and in the latter case, it would increase the overall power level of the primary data stream.

Figure 4A:
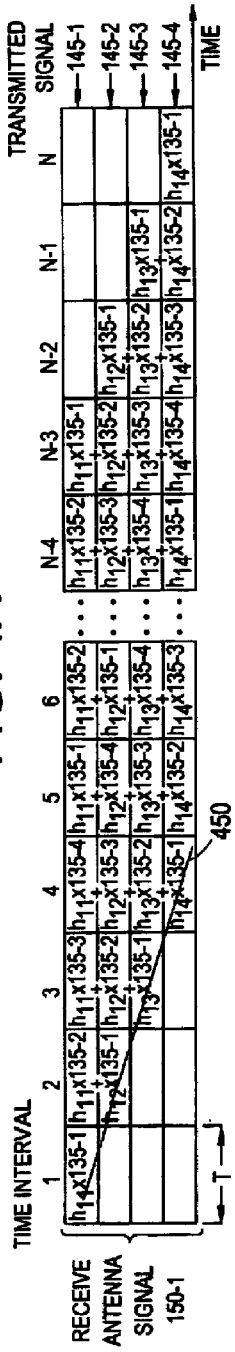
FIGS. 4*a* through 4*c* illustrate the receive antenna signals received on a respective one of the receive antennas of the system of FIG. 1 that uses the transmitter of FIG. 2.
Figure 4B:
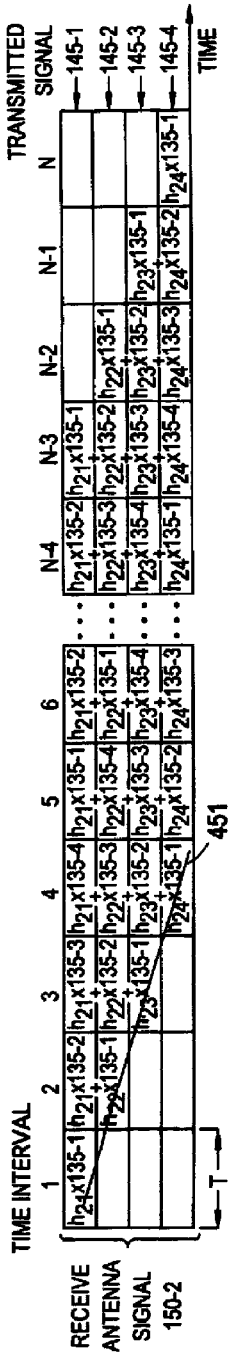
Figure 4C:
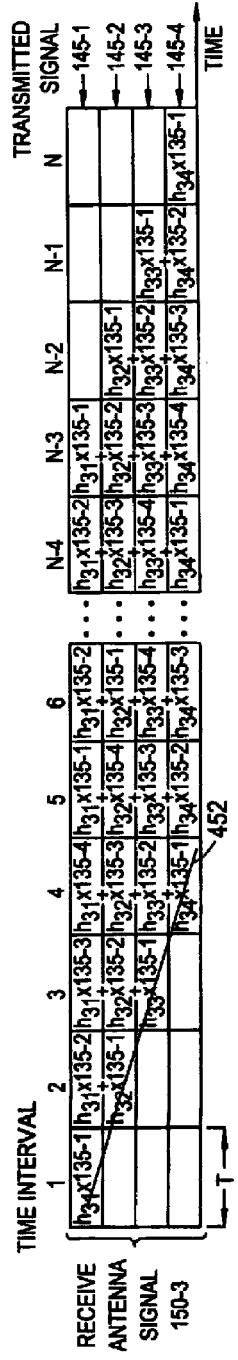

One advantageous method of implementing system 100 that increases its bit rate without having to increase the power level involves staggering the start of the transmission of transmitted signals 145-1, 145-2, 145-3, 145-4. Since at any particular time each transmitted signal includes a segment of one of the signals 135-1, 135-2, 135-3, and 135-4 that represent a respective sub-stream 125-1, 125-2, 125-3, and 125-4, then the start of the transmission of the sub-streams is also staggered. Thus, as shown in FIG. 3, in a first time interval, having a duration T, just signal 135-1 is transmitted. As described above, each of the receive signals 150-1, 150-2, 150-3 is a superposition of each of the transmitted signals as modified by the channel characteristics, plus noise η. Therefore, in the first time interval each receive antenna signal includes just the signal transmitted on the first transmit antenna, i.e. transmitted signal 145-1, plus noise. This means that each receive antenna signal includes just one signal 135-1 representing just one sub-stream 125-1 plus noise, as shown in FIGS. 4a–4c. For ease of reference the noise is not shown in FIGS. 4a, 4b, 4c, and 5. From here onward, the noise will be assumed to be part of the received signal unless otherwise mentioned.

In a second time interval, as can be seen in FIG. 3, signal 135-1 continues to be transmitted and the transmission of another signal 135-2, representing another sub-stream 125-2 is begun. This process continues until all of the signals 135-1, 135-2, 135-3, 135-4, representing all of the sub-streams 125-1, 125-2, 125-3, and 125-4, respectively, are being transmitted. Thus, in a second time interval each receive antenna signal now includes signals 135-1 and 135-2, as can be seen from FIGS. 4a, 4b, and 4c. This continues until each of the receive antenna signals includes all of the signals 135-1, 135-2, 135-3, and 135-4, representing all of the sub-streams 125-1, 125-2, 125-3, and 125-4, respectively.

Thereafter, the receive antenna signals 150-1, 150-2, 150-3 are processed to decode so-called layers of one of the transmitted signals. A layer is a portion of the signal (e.g. a particular number of symbols) that can be decoded with reference to only the symbols in that layer. For example, if the code used by encoder/modulators 130-1, 130-2, 130-3, and 130-4, shown in FIG. 2, that encode the bits into symbols is a block code, then a certain number of bits, called a code-word, is encoded into a particular number of symbols. These symbols can be used without any other symbols to reconstruct the code-word. In this case, a layer would be the set of symbols that can be used to reconstruct the code-word. If the code is a convolutional code, then each bit is encoded with the use of previous bits. In such a code the bits in the code can be encoded with only the use of previously encoded bits with the use of a terminating sequence either at the end or start of the bits to be encoded, as needed. This way a particular number of symbols can be decoded without reference to other symbols.

A layer may contain any number of symbols, and each symbol is typically two-dimensional (a complex number).

The first layer of signal 135-1 is shown in FIG. 3 as the signal along diagonal 350 and the first layer of signal 135-2 is along diagonal 355.

For ease of reference, the method will be described with each layer being transmitted contiguously, such as for example, the first layer of the signal 135-1 is transmitted in time interval 1 through time interval 4 and the first layer of the signal 135-2 is transmitted in time interval 2 through time interval 5, etc. However, a layer may be transmitted in two halves each half being at the opposite ends of the signal with respect to time. For example, half of the first layer of signal 135-1 could be transmitted at the beginning of the signal in time interval 1 through time interval 4 and the other half of this layer could be transmitted at the end of the signal in time intervals N–3 through N. As can be seen in FIGS. 3 and 4a through 4c, in this method the $N^{th}$ time interval has in common with the first time interval the advantage of containing just one signal representing one processed sub-stream. If it is the same as signal 135-1 that is transmitted in the first time interval, then, in both the first and the $N^{th}$ time interval, signal 135-1 is received with a good signal-to-noise ratio because no other signal interferes with it during these time intervals. The time interval that is a certain number of time intervals from the end of the signal includes the same signals, representing the same sub-streams, as a respective time interval the same number of time intervals from the start of the signal, e.g. the N–$1^{st}$ includes the same sub-streams as the $2^{nd}$ time interval. This allows the process described below for decoding and subtracting a layer when it is transmitted contiguously to be used to decode and subtract the layer when it is transmitted in two halves.

A layer will typically be received over several time intervals. In this embodiment a layer is received over four time intervals. (However a layer may be received over any number of time intervals, depending on the coding used in encoder/modulators 130-1, 130-2, 130-3, and 130-4.) As shown in FIGS. 4*a*, 4*b*, and 4*c*, the first layer of the signal 135-1 is received on each of the receive antennas 150-1, 150-2, and 150-3 during time intervals 1 through 4, shown along diagonals 450, 451, and 452, respectively. Note that each segment of each layer is modified by the channel characteristics, $h_{nm}$, of the particular channel over which it traveled. The receive antenna signals 510-1, 510-2, 510-3 received over these four time intervals are weighted with sets of weights, as shown in FIG. 5, to maximize the signal-to-noise ratio of signal 135-1. Typically, a different set of weights will be used in each time interval since signal 135-1 is transmitted on different transmit antennas in different time intervals. The weighted receive antenna signals are then combined to produce a combined-weighted-(remaining)-received-signal 520, which is then preprocessed to decode the first layer of signal 135-1 to obtain a certain number of bits of sub-stream 125-1. The first layer of signal 135-1 in combined-weighted-(remaining)-received-signal of is shown along diagonal 550.

In particular, the decoding process takes advantage of the fact that during the first time interval the receive antenna signals include only one signal, i.e. 135-1. Thus, there is no interference from the other signals. As a result signal 135-1 has a relatively high signal-to-noise ratio during the first time interval. Assuming appropriate coding prior to transmission, the high signal-to-noise ratio enables the first layer to be decoded with an acceptable error rate notwithstanding the presence in later time intervals of interference caused by layers of other signals. The decoded layer is then re-encoded and used to reconstruct the layer of signal 135-1 in the form that it was received by the receive antennas. The reconstructed layer is then cancelled as a source of interference for the other layers as described below, by for example subtracting it from the receive antenna signals to produce remaining receive antenna signals.

Similarly, the first layer of signal 135-2 is received on each of the receive antennas during time intervals 2 through 5. The receive antenna signals (that is the remaining receive antenna signals in intervals 2–4 and the receive antenna signals in interval 4) 560-1, 560-2, and 560-3 are weighted to maximize the signal-to-noise ratio of signal 135-2 in each of these time intervals. The weighted receive antenna signals are then combined to produce combined-weighted-(remaining)-received-signal. Since, during the second time interval there are only two signals, 135-1 and 135-2 received, and the layer of signal 135-1 was removed as a source of interference, then during this time interval there is no interference to signal 135-2 from the other signals 135-1, 135-3, and 135-4. As a result, signal 135-2 has a relatively high signal-to-noise ratio during the second time interval. This allows for a more accurate preprocessing and decoding of the first layer of signal 135-2, shown along diagonal 555.

The decoding of subsequent layers is carried out similarly, i.e. the remaining receive antenna signals (and, in intervals were there are not reconstructed layers subtracted out, the receive antenna signals) are weighted and combined to form the combined-weighted-(remaining)-received-signal. The interference from the layers that have not been decoded is treated as added noise. After a layer of a particular signal 135-1, 135-2, 135-3, or 135-4 is decoded, it can then be re-encoded and subtracted from the remaining receive antenna signal, eliminating it as source of interference for other layers. This process is repeated until all the layers of all of the signals 135-1, 135-2, 135-3, and 135-4, representing sub-streams 125-1, 125-2, 125-3, and 125-4, respectively, are decoded. This approach allows for an increased bit rate because prior to separating out a particular layer, the interference of other layers is removed for at least some of the particular layer. See, for example, U.S. Pat. No. 6,097,771 entitled "Wireless Communications System Having A Layered Space-Time Architecture Employing Multi-Element Antennas".

Disadvantageously, as can be seen in FIGS. 3, 4*a*, 4*b*, 4*c*, and 5, use of the staggered startup process means that there are some time intervals at the start and end of each burst, particularly time intervals 1, 2, 3, and N–2, N–1, and N in this example, when there is no data transmitted on some of the transmit antennas. This produces a lower bit rate than could be achieved if there was transmission on all of the transmit antennas in all the time intervals without having to reduce the bit rate to be able to sufficiently separate the component data streams.

Furthermore, the sub-streams are encoded so that each bit of the sub-stream is spread through all of the symbols in the layer representing the sub-stream, meaning that each symbol of the layer representing the sub-stream is a function of the value of each bit of the sub-stream. If there is strong interference and/or noise, a certain number of symbols may be corrupted. That is, these symbols will not be received correctly.

When the layer is long, the bits of the sub-stream represented by the layer can be still decoded from the non-corrupted symbols. However, if the layer is short, then these corrupted symbols may be the only symbols in the layer and there will not be any non-corrupted symbols to correctly decode the bits represented by this layer. Therefore, these bits will be erred. Thus, as the number of symbols in layer increases, its reliability—its resistance to interference and/or noise—also increases. Therefore, it would be advantageous to increase the number of symbols in each layer. However, as can be seen in FIGS. 3, 4*a*, 4*b*, 4*c*, and 5, in the above described staggered process it may be needed to keep the duration of a layer, and therefore the number of symbols in a layer, fairly small. For example, in the illustrative embodiment a layer is four time intervals in duration. While you would want to continue the layer to include the next layer representing the same sub stream it is disadvantageous to do so because as more layers representing the other sub-streams (i.e. the intervening layer) interfere with the layer, the signal-to-noise-ratio gets worse. Thus, it becomes more difficult to decode, and therefore the layer cannot extended in this way because it would reduces the reliability of the layer.

The duration of each layer may be increased by increasing the duration of each time interval, thus increasing the reliability of the layer. However, this increases the space-time at the beginning and end of each burst when no data is transmitted, thus, disadvantageously decreasing the bit rate.

The present invention provides a technique that allows for a further increase in the bit rate of a multiple-input and/or multiple-output system. According to the present invention, each sub-stream is stratified to produce a processed sub-stream, which would typically represent the sub-stream. The strata of a processed sub-stream can be separated out and decoded with an acceptable error rate. A sub-stream can be stratified by, for example, dividing it into a plurality of sub-stream-components that are processed to obtain the strata, with each stratum representing one of the sub-stream-components, and then combining the stratum to obtain the processed sub-stream. The processed sub-stream is then transmitted.

Stratifying allows a particular processed sub-stream's strata to have different transmit features from each other, such as different bit rates, or different power levels, or both. This advantageously allows for a startup process that starts transmission of a plurality of processed sub-streams concurrently on many, or even all, antennas without having to stagger the start of the transmission, while still allowing the processed sub-stream to be decoded with an acceptable error rate and still keeping the overall bit rate of the processed sub-stream relatively high and the overall power level relatively low.

Figure 6:
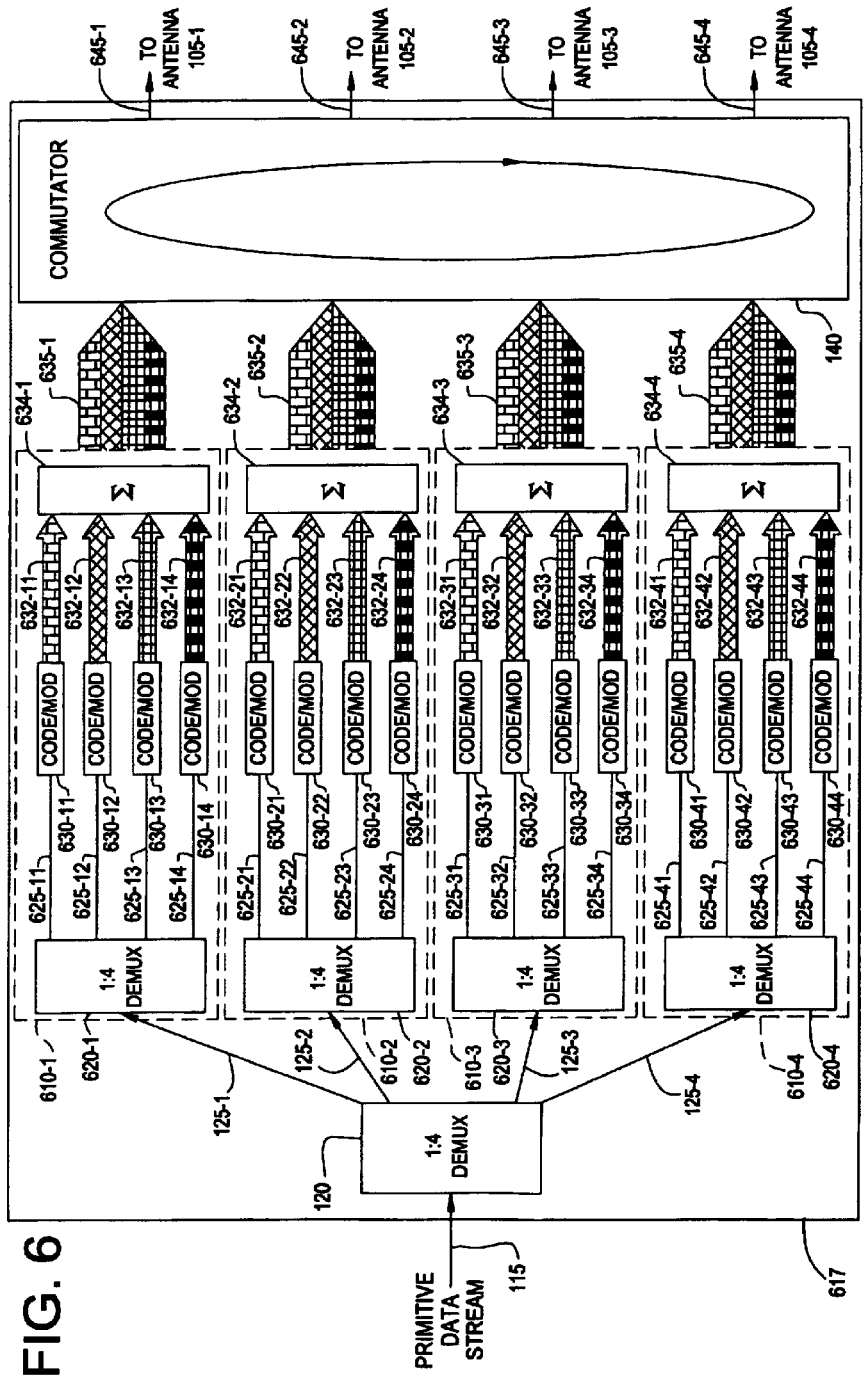
FIG. 6 illustrates a transmitter in accordance with one embodiment of the present invention for use in the multiple-input, multiple-output system of FIG. 1.

FIG. 6 shows transmitter 617 in accordance with the principles of the invention. Transmitter 617 can be used to replace transmitter 117 in multiple-input, multiple-output wireless communication system 100 of FIG. 1. Transmitter 617 receives primitive data stream 115 and demultiplexes it in demultiplexer 120 into a plurality of sub-streams 125-1, 125-2, 125-3, and 125-4. Illustratively, the number of sub-streams equals the number of transmit antennas, so that at some point in time there is a sub-stream being transmitted on each of the transmit antennas. However, the number of sub-streams may be larger or smaller than the number of transmit antennas.

Each sub-stream 125-1, 125-2, 125-3, and 125-4 is processed in stratifier 610-1, 610-2, 610-3, and 610-4, respectively to produce processed sub-streams 635-1, 635-1, 635-3, and 635-4, respectively, each of which represents its respective sub-stream 125-1, 125-2, 125-3, and 125-4. Each stratifier demultiplexes its respective sub-stream in demultiplexers 620-1, 620-2, 620-3, and 620-4, respectively, into a plurality of sub-stream-components 625-11, 625-12, 625-13, and 625-14; 625-21, 625-22, 625-23, and 625-24; 625-31, 625-32, 625-33, and 625-34; and 625-41, 625-42, 625-43, and 625-44; respectively. Each of the sub-stream-components is processed in respective circuitry, such as encoder/modulators 630-11, 630-12, 630-13, 630-14, 630-21, 630-22, 630-23, 630-24, 630-31, 630-32, 630-33, 630-34, 630-41, 630-42, 630-43, and 630-44, respectively, to produce strata. The codes used by the encoders can be any codes, such as, for example, codes in which the bits are independently coded, or codes of the same structure in which the bits are independently coded. For example, in the illustrative embodiment the code can be one that uses the same selection process to select the mapping of the bits into symbols but the resulting symbols are different for each stratum. As described below, such a coding will make it easier to decode the stratum. If the transmit signals are to be transmitted using an air interface that complies with a Code Division Multiple Access (CDMA) standard, then each encoder/modulator, in addition to other coding, if any, spreads its respective sub-stream component with a Walsh code—an orthogonal spreading code, and possibly with a long scrambling code. In the illustrative embodiment, all of the encoder/modulators use the same Walsh codes. Although, in other embodiments of the invention each of the encoder/modulators may use a different Walsh code, or groups of encoder/modulators, such as for example, the encoder/modulators in each stratifier, may use the same Walsh code that is different from the Walsh codes used by other groups of encoder/modulators.

Each stratum 632-11, 632-12, 632-13, 632-14, 632-21, 632-22, 632-23, 632-24, 632-31, 632-32, 632-33, 632-34, 632-41, 632-42, 632-43, and 632-44 is a signal that represents a sub-stream component 625-11, 625-12, 625-13, 625-14, 625-21, 625-22, 625-23, 625-24, 625-31, 625-32, 625-33, 625-34, 625-41, 625-42, 625-43, and 625-44, respectively.

The strata representing the sub-stream-components of a particular sub-stream are then recombined in combiners 634-1, 634-2, 634-3, and 634-4, which may be, for example summing circuits. So, strata 632-11, 632-12, 632-13, and 632-14 are combined in combiner 634-1 to form processed sub-stream 635-1. Similarly, strata 632-21, 632-22, 632-23, and 632-24 are combined in combiner 634-2 to from processed sub-stream 635-2. Strata 632-31, 632-32, 632-33, and 632-34 are combined in combiner 634-3 to from processed sub-stream 635-3. And, strata 632-41, 632-42, 632-43, and 632-44 are combined in combiner 634-4 to from processed sub-stream 635-4. The combiner can be for example a summer.

Each processed sub-stream 635-1, 635-2, 635-3, and 635-4 can then be transmitted over a respective different transmit antenna. Preferably, however, as shown in FIG. 6 the processed sub-streams 635-1, 635-2, 635-3, and 635-4 are cycled via commutator 140 over all of the transmit antennas, in the manner described earlier, so that successive segments of each processed sub-stream are transmitted over different ones of the transmit antennas cyclically. The processed sub-streams 635-1, 635-2, 635-3, and 635-4 thus share a balanced presence over the channels between each of the transmit and receive antennas shown in FIG. 1. Therefore, none of the individual processed sub-streams are continuously subjected to the worst of the channels. As can be seen in FIG. 6, at a particular point in time, each of the processed sub-streams is applied to a respective one of the transmit antennas. Thus, at a particular point in time, the strata of one processed sub-stream are applied to one transmit antenna. (Although in an alternative embodiment of the invention, at a particular point in time a processed sub-stream may be transmitted over several transmit antennas, or several processed sub-streams may be transmitted over the same transmit antenna.)

As described above, a particular processed sub-stream's strata can be transmitted at different bit rates from each other, or at different power levels from each other, or both. This allows the start of transmission on many, or even all, of the antennas without having to stagger the start of the transmission while still retaining an acceptable error rate and a relatively high overall processed sub-stream bit rate.

Figure 7:
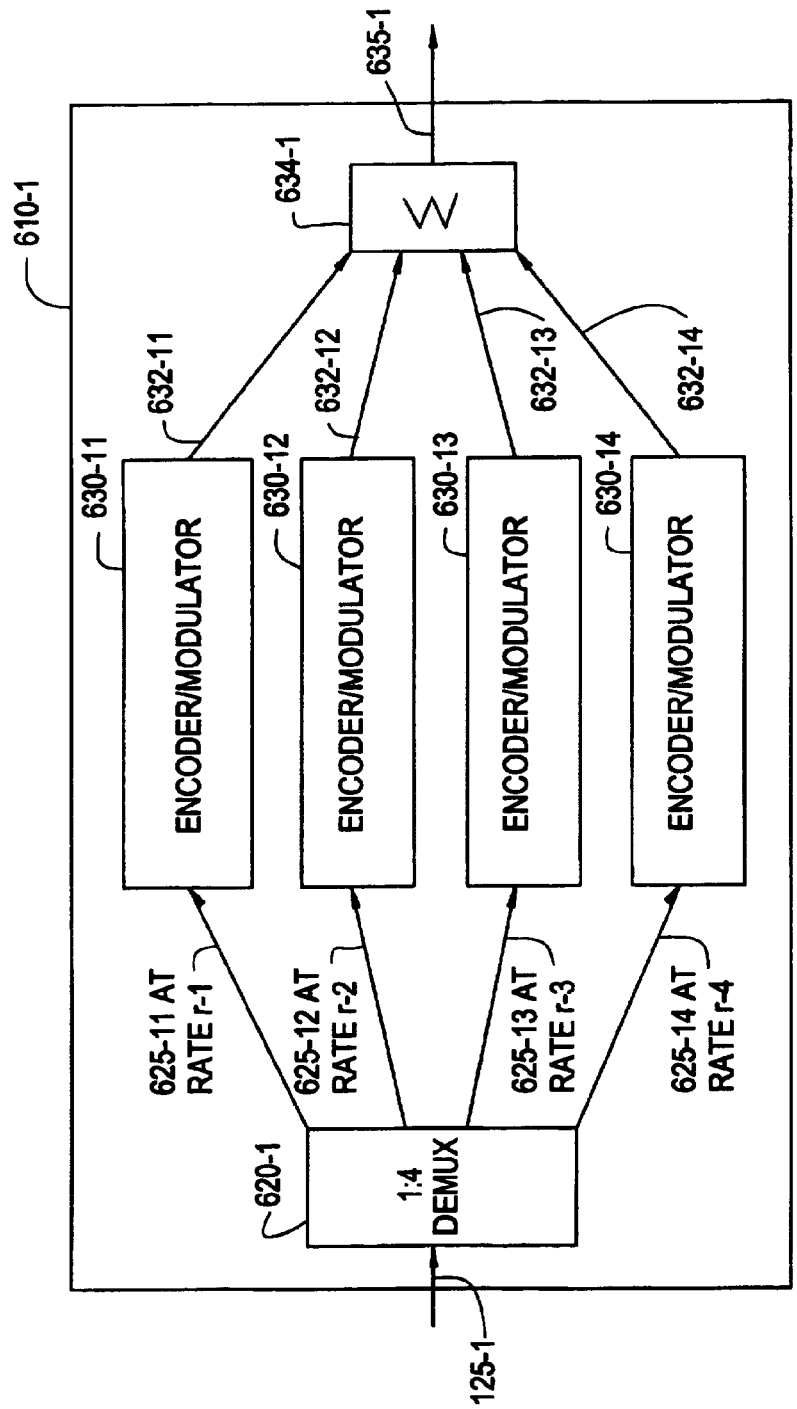
FIG. 7 illustrates in more detail a stratifier according to one embodiment of the invention, where the stratifier produces a processed sub-stream whose strata have bit rates that are different from each other.

FIG. 7 shows in more detail stratifier 610-1 according to one embodiment of the invention where the bit rates of a particular processed sub-stream's strata are ranged from lower to higher. Stratifier 610-1 includes a variable rate demultiplexer 620-1 that demultiplexes sub-stream 125-1 into a plurality of sub-stream-components 625-11, 625-12, 625-13, and 625-14 of different bit rates r-1, r-2, r-3, and r-4, respectively. The relationship between these bit rates is a tradeoff between the desire for uniformity of design and the desire to get the bit rate of a processed sub-stream to as high an overall bit rate as possible as quickly as possible given the particular number of strata. For example, these bit rates may be any factor of each other from a factor of just over 1 to about a factor 3 of times. Thus, for example r-2 may be twice r-1, and r-3 twice r-2. Each of the sub-stream-components is processed in one of the encoder/modulators 630-11, 630-12, 630-13, and 630-14, respectively to produce strata 632-1, 632-2, 632-3, and 632-4. The strata are then recombined in combiner 634-1 to form processed sub-stream 635-1. Thus, processed sub-stream 635-1 is composed of: 1) stratum 625-11 having a bit rate of r-1, 2) stratum 625-12 having a bit rate of r-2, 3) stratum 625-13 having a bit rate of r-3, 4) and stratum 625-14 having bit rate of r-4. Each of the other sub-stream-components 125-2, 125-3, and 125-4 is similarly processed in stratifiers 610-2, 610-3, and 610-4, respectively, to produce processed sub-streams 635-2, 635-3, and 635-4, respectively, composed of strata of differing bit rates. As described above the processed sub-streams 635-1, 635-2, 635-3, and 635-4 are cycled via commutator 140 over all of the transmit antennas. Thus, as can be seen in FIG. 8 as time goes on and each processed sub-stream is cycled over the transmit antennas, each of the transmitted signals 645-1, 645-2, 645-3, and 645-4 emanating from transmit antennas 105-1, 105-2, 105-3, and 105-4, respectively, includes segments of different processed sub-streams. The cycled processed sub-streams are then transmitted over antennas 105-1, 105-2, 105-3, and 105-4. For further information in selecting the different bit rates see Appendix A.

Figure 9A:
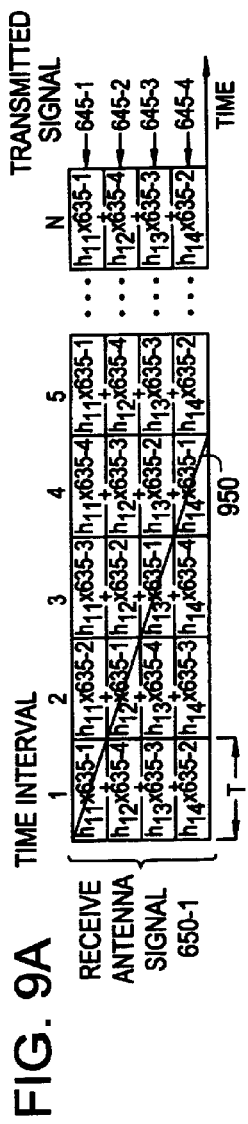
FIGS. 9a through 9c illustrate the receive antenna signals received on a respective one of the receive antennas of the system of FIG. 1 that uses the transmitter of FIG. 6.
Figure 9B:
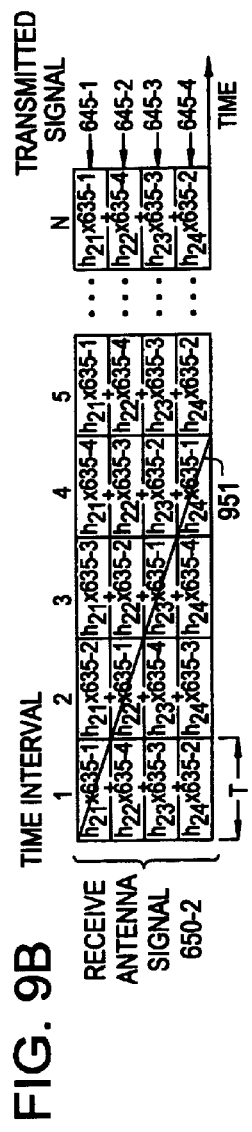
Figure 9C:
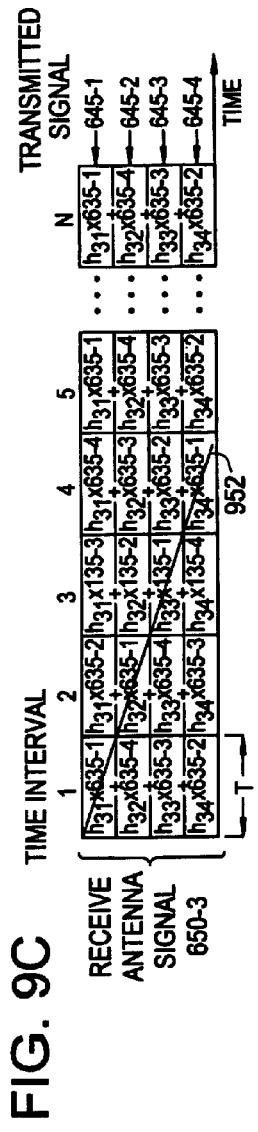

Each of the transmitted signals 645-1, 645-2, 645-3, and 645-4, and thus each of the processed sub-streams 635-1, 635-2, 635-3, and 635-4 arrive at each receive antenna 110-1, 110-2, and 110-3. Thus, the received signal 650-1, 650-2, and 650-3 at each of the receive antennas (regardless of whether there are one or many receive antennas) is a superposition of each of the processed sub-streams 635-1, 635-2, 635-3, and 645-4 as modified by the channel characteristics, plus noise $\eta$. The receive antenna signals are shown in FIGS. 9a, 9b, and 9c. For ease of reference the noise is not shown in FIGS. 9a, 9b, and 9c. From here onward the noise will be assumed to be part of the received signal unless otherwise mentioned.

FIG. 10 illustrates receiver 1155 in accordance with the present invention. Receiver 1155 can be used to replace receiver 115 in multiple-input, multiple-output system 100 of FIG. 1. The receive antenna signals 650-1, 650-2, and 650-3 are provided through the outputs of receive antennas 110-1, 110-2, and 1103 to processor 1120 where the receive antenna signals 650-1, 650-2, and 650-3 are weighted and combined so as to maximize the signal-to-noise ratio of a respective one of the transmitted signals. (See, for example, G. J. Foschini and M. J. Gans, "On Limits of Wireless Communications in a Fading Environment When Using Multiple Antennas," Wireless Personal Communications, 6 Kluwer Academic Publishers, 1998, pp. 311–335.) At least a portion of the combined-weighted-(remaining)-received-signal is processed in each of processor 1120's strata processors 1125-1, 1125-2, 1125-3, and 1125-4 to decode at least a portion, such as a layer, of each of the processed sub-streams 635-1, 635-2, 635-3, and 635-4. The first layer of processed sub-stream 635-1 is shown in FIG. 8 as the signal along diagonal 850 and the first layer of processed sub-stream 635-2 is the signal along diagonal 855.

As described above, weights can be used to emphasize the contribution of a particular transmitted signal in the combined-weighted-(remaining)-received-signal and attempt to relegate to a noise-like status the contribution of the other transmitted signals. Similarly, weights can be used to emphasize the contribution of a particular strata of a transmitted signal in the combined-weighted-(remaining)-received-signal. In this way, the weights are used so that the combined-weighted-(remaining)-received-signal is made to closer resemble the strata. This allows the particular strata to be separated out and decoded from the combined-weighted-(remaining)-received-signal if either 1) the particular transmitted signal is at an appropriate bit rate or 2) additional manipulation, such as the staggered startup process, is used.

It would typically be advantageous for the layer to include a large part of its respective processed sub-stream. The number of time intervals over which a layer is received depends on the coding used in the encoder/modulators 630-11 through 630-44. In the preferred embodiment each layer includes its entire respective processed sub-stream that was transmitted in a single signal burst, that is the processed sub-stream that would be transmitted from the start to the end of a signal burst. For example, the first layer of processed sub-stream 635-1 can include the entire processed sub-stream 635-1. Alternatively, the first layer of processed sub-stream 635-1 can include the signal along diagonal 850 and the signal in the top box of time interval 5, and continue further for any desired number of time intervals. An advantage of the present invention is that the number of symbols that make up a layer can be increased, thus increasing reliability—resistance to interference and/or noise. This, eliminates some of the above-described possible problems in the staggered start-up process. However, for ease of illustration, the layers will be described with each layer being the part of its processed sub-stream that is transmitted over four time intervals.

The first layer of processed sub-stream 635-1 is received on each receive antenna 110-1, 110-2, and 110-3 during time intervals 1 through 4, as shown in FIGS. 9a, 9b, and 9c along diagonal 950, 951, and 952, respectively. The receive antenna signals received over these four time intervals are weighted with a set of weights in each of the strata processors 1125-1, 1125-2, 1125-3 and 1125-4, each of which produces a different combined-weighted-received-signal in each time interval. (Thus, the receive antenna signals are weighted in processor 1120 with four sets of weights in each time interval to produce four different combined-weighted-received-signals in each time interval.) In a particular time interval, each of these combined-weighted-received-signals maximizes the signal-to-noise ratio of one of the strata representing one of the sub-stream components. This process is now described in more detail for two processed sub-streams 635-1 and 635-2. The receive antenna signals 650-1, 650-2, and 650-3 are weighted in strata processor 1125-1 with a set of weights to maximize the signal-to-noise ratio of one of the strata of processed sub-stream 635-1, representing sub-stream 125-1. Typically, a different set of weights will be used in each time interval since processed sub-stream 635-1 is transmitted on a different transmit antenna in different time intervals. The weighted receive antenna signals are then combined in strata processor 1125-1 to produce a combined-weighted-(remaining)-received-signal. The combined-weighted-(remaining)-received-signal is then preprocessed in decoders 1127-11, 1127-12, 1127-13 and 1127-14, as described in the following paragraph, to decode the strata of the first layer of processed sub-stream 635-1, representing sub-stream 125-1. Similarly, the receive antenna signals are weighted in strata processor 1125-2 to maximize the signal-to-noise ratio of one of the strata of processed sub-stream 635-2 in each of these time intervals. The weighted receive antenna signals are then combined to produce a combined-weighted-(remaining)-received-signal. The combined-weighted-(remaining)-received-signal is then preprocessed as described in the following paragraph to decode a stratum of the first layer of processed sub-stream 635-2, representing sub-stream 125-2. The combined-weighted-(remaining)-received-signals for the other two processed sub-streams are similarly obtained.

Once the combined-weighted-(remaining)-received-signals are obtained, strata processor 1125-1 separates out a stratum of the processed sub-stream with the lowest bit rate, i.e. stratum 632-11, and passes it to decoder 1127-11 where stratum 632-11 is decoded with an acceptable error rate. The weights are selected to emphasize the contribution of a particular stratum in the combined-weighted-(remaining)-received-signal and attempt to relegate to a noise-like status the contribution of the other concurrently transmitted strata. In this way, the weights are used so that the combined-weighted-(remaining)-received-signal is made to more closely resemble the particular stratum. Thus, each strata is emphasized in one of the combined-weighted-(remaining)-received-signals. The bit rate of stratum 632-11 being relatively low facilitates using the combined-weighted-(remaining)-received-signal that emphasizes processed sub-stream 635-1 to distinguish and then decode with an acceptable error rate the symbols of this stratum, as described in more detail below, to produce the bits of sub-data-stream component 625-11. The decoded bits of the sub-stream component 625-11 are then provided to multiplexer 1164-1.

The decoded bits of the sub-stream component 625-11 are then re-encoded in encoder/modulator 1130-11, which reconstructs the stratum in the form that it was received by the receive antennas. The stratum is then subtracted from each of the receive antenna signals in strata processor 1125-1. Subtracting this stratum from the receive antenna signals eliminates this stratum as a source of interference for the rest of the strata. This allows a stratum of a layer with a higher bit rate to then be separated from a weighted combined signal where the weights emphasize this strata and decoded with an acceptable error rate in strata processor 1125-1 and decoder 1127-2, provided to multiplexer 1164-1, reconstructed in encoder/modulator 1130-12, and subtracted from each of the remaining receive antenna signals in strata processor 1125-1. (Note, the remaining receive antenna signals are the receive antenna signals that remain after the previously reconstructed stratum is subtracted from the receive antenna signals.) Subtracting out this reconstructed stratum further reduces the interference for the rest of the strata, allowing a stratum of a layer with an even higher bit rate to be separated from a weighted combined signal where the weights emphasize this strata, decoded with an acceptable error rate, provided to multiplexer 1164-1, reconstructed, and subtracted from the remaining receive antenna signal. This process continues until all of the strata, representing all of the sub-stream-components, are decoded. The sub-data-stream components 625-11, 625-12, 625-13 and 625-14 are multiplexed in multiplexer 1164-1 to produce sub-stream 125-1.

The collection of strata, one from each processed sub-stream that are decoded in the same order, for example second, within its respective processed sub-stream are referred to herein as a ply, regardless of whether these strata have the same bit rates.

In the just described process, several, or all, of the processed sub-streams may be processed 1) concurrently, 2) successively, or 3) a combination of the two. Thus, in the first case, processor 1120 can concurrently process each processed sub-stream to separate out and decode its respective strata that is part of a particular ply. In this case it may be advantageous for all of the strata that is part of a particular ply to have the same bit rate as the rest of the strata in that ply.

In the second case, the strata in the ply with the lowest bit rate may be processed successively, and then the strata in the ply with a higher bit rate may be processed successively. In this case, it may be advantageous for the lowest bit rate of the first processed sub-stream to be processed to be the lowest bit rate of all of the strata. The strata with the lowest bit rates of the other processed sub-streams to be successively higher, but lower than the bit rate of the strata with the second highest bit rate of the first processed sub-stream.

In other alternative cases, the processed sub-streams may be processed in accordance with a combination of several of the above cases. Thus, for example, processed sub-streams 635-1 and 635-2 may be processed concurrently in accordance with the first case. Processed sub-stream 635-3 may then be processed subsequent to 635-1 and 635-2 in accordance with the second case described above and similarly processed sub-stream 635-4 may be processed subsequent to processed sub-stream 635-3.

(Additionally, in another alternative, but less preferred case, at least one layer of each strata of one processed sub-stream to be separated out and decoded before the layers of any of the strata of another processed sub-stream are separated out and decoded. In this case, it may be advantageous for the strata of the processed sub-stream, such as 635-1, that will be decoded first to be of a lower bit rate than the strata of the processed sub-stream, such as 635-2, that will be subsequently decoded.)

Although, an advantageous hierarchy for the bit rates of the strata is proposed for the some of the above cases, the hierarchy of the bit rates of the cases may be of any type. For example, regardless of the way the processed sub-streams are processed, all of the strata that is part of a particular ply may have the same bit rate as the rest of the strata in that ply.

Ranging the bit rate of a particular processed sub-stream's strata from a lower to higher bit rate produces an overall bit rate for the processed sub-stream that is higher than the bit rate if the layers were not stratified.

As described above, once sub-stream-components are decoded, they can then be multiplexed in processor 1120's multiplexers 1164-1, 1164-2, 1164-3 and 1164-4 to get respective sub-streams 125-1, 125-2, 125-3, and 125-4. Thus, 625-11, 625-12, 625-13, and 625-14 would be multiplexed to produce 125-1. 625-21, 625-22, 625-23, and 625-24 would be multiplexed to produce 125-2. 625-31, 625-32, 625-33, and 625-34 would be multiplexed to produce 125-3. And 625-41, 625-42, 625-43, and 625-44 would be multiplexed to produce 125-1. The sub-streams 125-1, 125-2, 125-3, and 125-4, would then be multiplexed together in processor 1120's multiplexer 1170 to recover primitive data stream 115.

Figure 11:
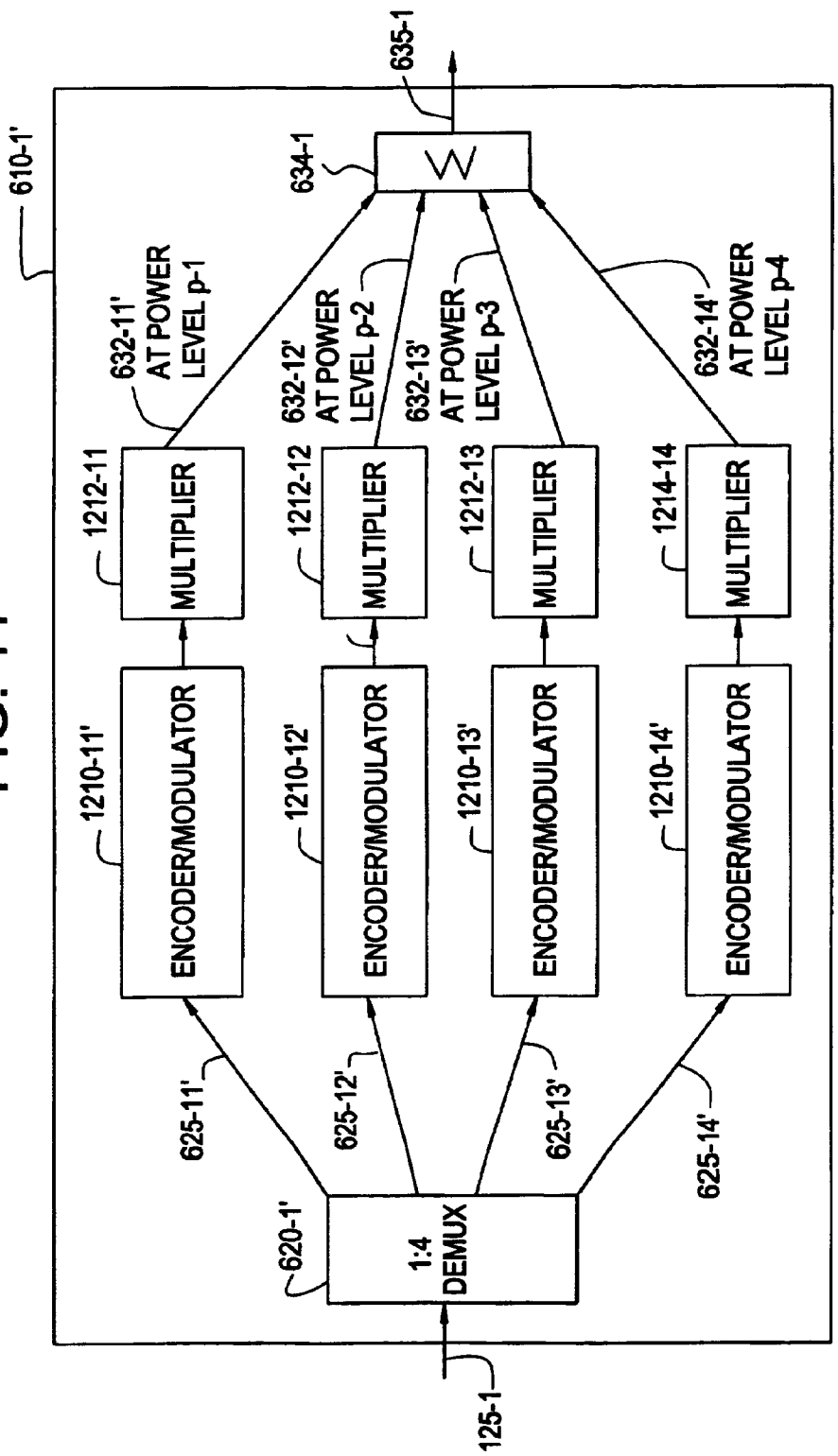
FIG. 11 illustrates in more detail a stratifier according to another embodiment of the invention, where the stratifier produces a processed sub-stream whose strata have power levels that are different from each other.

FIG. 11 shows in more detail stratifier 610-1' according to another embodiment of the invention where the power levels of a particular processed sub-stream's strata are ranged from higher to lower. Stratifier 610-1' includes demultiplexer 620-1' that demultiplexes sub-stream 125-1 into a plurality of sub-stream-components 625-11', 625-12', 625-13', and 625-14' of equal bit rates. Each of the sub-stream-components is encoded and modulated in encoder/modulators 1210-11, 1210-12, 1210-13, and 1210-14, respectively to produce strata.

The encoder/modulators 1210-11, 1210-12, 1210-13, and 1210-14 of one stratifier, that is the encoder/modulators that process the same sub-stream, may produce the strata at different power levels from each other. For example, these power levels may be any factor of each other from a factor of just over 1 to a factor of about 4. Thus, for example the power level of the strata produced by encoder/modulators 1210-11, 1210-12, 1210-13, and 1210-14 may be p-1, p-2, p-3, and p-4, respectively where p-2 may be twice p-1, and p-3 twice p-2. For further information in selecting the different power levels see Appendix A.

Alternatively, as shown in FIG. 11, the encoder/modulators 1210-11, 1210-12, 1210-13, and 1210-14 of one stratifier may produce the strata at the same power level which is then scaled to produce strata at different power levels from each other. The strata can be scaled by, for example, multipliers 1212-11, 1212-12, 1212-13, and 1212-14 that multiply each stratum by a scaling factor.

The stratum 632-11', 632-12', 632-13', and 632-14' are then recombined in combiner 634-11 to from processed sub-stream 635-1'. Thus, processed sub-stream 635-1' is composed of strata 632-11' having a power level of p-1, 632-12' having a power level of p-2, 632-13' having a power level of p-3, and 632-14' having a power level of p-4. Each of the other component data streams 125-2, 125-3, and 125-3 is similarly processed in stratifiers 610-2', 610-3', and 610-4' to produce processed sub-streams 635-2', 635-3', and 635-4' composed of strata of differing power levels. As described above, the processed sub-streams 635-1', 635-2', 635-3', and 635-4' are cycled via commutator 140 over all of the transmit antennas and transmitted over antennas 105-1, 105-2, 105-3, and 105-4.

Each of the transmitted signals arrive at each receive antenna 110-1, 110-2, and 110-3 and similarly to the above described embodiment are weighted and combined in processor 1120's strata processors 1125-2, 1125-3, 1125-4, respectively so as to maximize the signal-to-noise ratio of a respective one of the transmitted signals in each time interval.

Once the combined-weighted-(remaining)-received-signals are obtained, a stratum with the highest power level is first separated out from a weighted combined signal where the weights emphasize this strata in the strata processors, decoded with an acceptable error rate in one of the decoders, reconstructed in one of the encoder/modulators, and subtracted from the receive antenna signals in the strata processors. As described above, the weights emphasize the contribution of a stratum in the combined-weighted-(remaining)-received-signal and attempt to relegate to a noise-like status the contribution of the other transmitted signals. In this way, the weights are used so that the combined-weighted-(remaining)-received-signal is made to more closely resemble the particular stratum. Thus, each of the stratum is emphasized in one of the combined-weighted-(remaining)-received-signals. The power level of the stratum with the highest power level being relatively high facilitates using the combined-weighted-(remaining)-received-signal that emphasizes the processed sub-stream containing this stratum to separate out and decode the symbols of this stratum with an acceptable error rate, as described in more detail in the next paragraph. This allows a stratum of a layer with a lower power level to then be separated from a weighted combined signal where the weights emphasize this strata, decoded with an acceptable error rate, reconstructed, and subtracted from the receive antenna signals. This process continues until all of the strata, representing all of the sub-stream-components, are decoded.

Separating out and decoding symbols of this stratum with an acceptable error rate is now illustrated with an example. Because the power level of stratum 632-11 is twice the power level of stratum 632-12, i.e., the stratum with the next highest power level in the same processed sub-stream 635-1, the contribution to the symbol values from the other strata of processed sub-stream 635-1—which effectively constitutes noise for stratum 632-11—is small enough to be able to separate out stratum 632-11. This enables the bits of stratum 632-11 represented by received symbols to be recovered with an acceptably high degree of accuracy.

Once the bits are obtained they are re-encoded and modulated to obtain the values of the symbols as originally encoded and modulated in the transmitter, for example by using the coding and the modulation used by stratifier 610-1'. The values of these symbols are then processed using channel characteristics to obtain values of symbols that would represent stratum 632-11 as received by the receive antennas. These values are subtracted from the values of the symbols of layer 635-1 to obtain the processed symbols of layer 635-1.

Since the power level of the stratum 632-12 is twice the power level of stratum 632-13, i.e., the stratum with the next highest power level in the same processed sub-stream 635-1, then the contribution the processed symbols of layer 635-1 from other not subtracted out strata of processed sub-stream 635-1 is small enough to be able to separate out stratum 632-12. This enables the bits of stratum 632-12 to be recovered with an acceptably high degree of accuracy. The bits are re-encoded, modulated, processed using the channel characteristics, and the result is subtracted from the values of the processed symbols of layer 635-1. This then allows a stratum with a lower power level to be similarly separated-out from a weighted combined signal where the weights emphasize this strata and decoded with an acceptable error rate, reconstructed, and subtracted from the received signal. This process continues until all of the strata, representing all of the sub-stream-components, are decoded.

For bursts of a limited duration, ranging the power level of a particular processed sub-stream's strata produces in practice a higher bit rate than that produced if a staggered startup process was used. Additionally, although ranging the power level of the strata may use somewhat more power than ranging the bit rates of the strata, ranging the power level of the strata allows for a greater uniformity of design.

Optionally, in a third illustrative embodiment both the bit rates and the power levels of a particular processed sub-stream's strata are ranged, such as, for example, from lower to higher and higher to lower, respectively. At least a stratum of the layer, for example the stratum with the lowest bit rate and highest power level, is first separated out from a weighted combined signal where the weights emphasize this strata, decoded with an acceptable error rate, reconstructed, and subtracted from the receive antenna signal. This in turn allows a stratum of a layer with a lower power level and higher bit rate to then be separated from a weighted combined signal where the weights emphasize this strata, decoded with an acceptable error rate, reconstructed, and subtracted from the received signal. This process continues until all of the strata, representing all of the sub-stream-components, are decoded. Optimal bit rates and power levels may be selected to increase the maximum bit rate of the overall processed sub-stream, and thus increase the overcall capacity of the system. Optimal bit rates and power levels may be selected by any method, including by empirical studies, such as for example by selecting a particular sets of power levels and bit rates and then adjusting these sets of power levels and bit rates to obtain a desired overall system bit rate.

The processed sub-streams of the present invention can comply with any transmission standard, including CDMA, Orthogonal Frequency Division Multiplexing (OFDM), Frequency Division Multiple Access (FDMA), Time Division Multiple Access (TDMA), or Global System for Mobile communications (GSM). Therefore, multiple-input, multiple-output wireless communication system 100 can be any type of system, including a CDMA, OFDM, FDMA, TDMA, GSM system, respectively, meaning that the system complies with that particular standard.

Most of the above standards allow for the use of either wide or narrow frequency bands, referred to herein as wide-band and narrow-band respectively; although some of standards, such as CDMA, will require a wide bandwidth to transmit signals in typical applications. When the bandwidth is wide-band, possible inter-symbol and inter-chip coupling may need to be taken into account. Narrow bandwidths typically have frequency flat channels—ones whose complex signal amplitude does not vary across the frequency band—also referred to as channels whose characteristics are flat. Signals transmitted over frequency flat channels do not typically couple. However, wide bandwidths typically do not have frequency flat channels, and the signals transmitted over non-frequency flat channels may couple with each other and/or with themselves. This means that there is inter-symbol interference between the symbols of these signals. The inter-symbol interference makes it more difficult to decode the data stream represented by these symbols. Additionally, if the symbols are coded with a spreading code, such the as Walsh codes used in CDMA systems, that has so-called chips then the signals coupling means that there is inter-chip interference, which will cause inter-symbol interference.

The coupling can be dealt with in any way that allows the bits represented by the symbols of the signals received by the receive antennas to be decoded. One way of dealing with the coupling is to transmit the signals as described above and to use the well-known process of equalizing the signals at the receiver. For example, each received antenna signal could be despread if necessary and then equalized in an equalizer. The equalizer could be one that, for example, stores a number of past inputs and then combines these past inputs linearly with weights that are optimized to decode the symbols of the receive antenna signals. For more information on equalization see, for example, A. J. Paulraj and C. B. Papadias, "Space-Time Processing for Wireless Communications," IEEE Signal Processing Magazine November 1997 1053–5888, IEEE, 1997, pp. 49–83, incorporated herein by this reference.

Another way of dealing with the coupling is to first divide the primary data stream, in accordance with well-known OFDM techniques, into a plurality of sub-primary data streams, each of which will be modulated to be in a different frequency band. Then stratify the sub-streams of each sub-primary data stream as described above for each of the sub data streams of the primary data stream. The resulting processed sub-streams representing the sub-streams of the different sub-primary data streams would be modulated to be at different narrower frequency bands. The received antenna signal would now include signals in different frequency bands. The signals in each frequency band could be processed as described above to obtain the sub-primary data streams represented by the signals transmitted in each band. Each of these sub-primary data streams could then be combined using well-known OFDM techniques to obtain the primary data stream.

The foregoing is merely illustrative and various alternatives will now be discussed. For example the processing of the sub-stream-components may include one or more of the following in any combination: coding, modulating, and spreading the sub-stream component. The coding of the sub-stream component may involve using the same or different codes for each sub-stream component. The modulation may involve using the same or different modulation schemes and/or using the same or different frequency bands. Similarly, the spreading can include using the same or different spreading codes.

In the illustrative embodiment the stratifier includes an encoder/modulator for each sub-stream component. In alternative embodiments the encoder/modulators for each of the stratifiers may be implemented as either a single circuit or as multiple circuits that includes the encoder/modulator for one or for multiple sub-stream-components. Additionally, the encoder/modulators for all of the stratifiers can be implemented as a single circuit or as multiple circuits that includes the encoder/modulator for one or for multiple stratifiers. Furthermore, any of all of the encoder/modulators may be implemented in software, and, additionally, the entire stratifier may be implemented in software.

Similarly, the processor may be implemented as either a single circuit or as multiple circuits. Additionally, the processor, or any part thereof may be implemented in software.

The transmitter and receiver of the illustrative embodiments can be any transmitter and receiver of a wireless communication system. For example, in one illustrative embodiment the transmitter can be part of a base station and the receiver part a mobile terminal, and/or vice versa, i.e. the transmitter can be part of the mobile terminal and the receiver part of the base station. In another illustrative embodiment the transmitter can be part of a wireless hub of a wireless local area network and the receiver part a terminal of a wireless local area network, such as a laptop, and/or vice versa. In yet another illustrative embodiment each of the transmitter and receiver can be part of a fixed wireless network, for example the transmitter and receiver can be part of a fixed wireless system set up for communication between two buildings.

In the illustrative embodiment the sub-stream component are encoded, modulated, and then combined. In alternative embodiments, the encoding, modulation, and combining can be performed together.

In the illustrative embodiment each sub-steam is divided into the same particular number of sub-stream components. In alternative embodiments, each sub-stream may be divided into any number of sub-stream components and the number of sub-stream component of one sub-stream may be different than the number of sub-stream components of another sub-stream.

In the illustrative embodiment the receive antenna signals are weighted to maximize the signal-to-noise ratio of a particular stratum in a particular time interval. In alternative embodiments a coarse weighting may use or alternatively the weighting step may left out. For example, the receive antenna signals may just be combined and then be processed to decode the sub-stream-components.

In the illustrative embodiment the re-encoded strata is removed from the receive antenna signals and/or the remaining receive antenna signals. In alternative embodiments, the re-encoded strata are not removed from the receive antenna signals and the receive antenna signals are used to obtain each stratum.

The block diagrams presented in the illustrative embodiments represent conceptual views of illustrative circuitry embodying the principles of the invention, one or more of the functionally of the circuitry represented by the block diagrams may be implemented in software by one skilled in the art with access to the above descriptions of such functionally.

Thus, while the invention has been described with reference to a preferred embodiment, it will be understood by those skilled in the art having reference to the specification and drawings that various modifications and alternatives are possible therein without departing from the spirit and scope of the invention.

We claim:

1. A method for use in a system that is adapted to communicate a primitive data stream, the primitive data stream including a plurality of sub-streams, the method comprising the step of:
   transmitting at least a portion of a processed sub-stream, the processed sub-stream representing one of the plurality of sub-streams,
   the processed sub-stream including a plurality of strata, each stratum of the processed sub-stream representing a respective sub-stream component of the one sub-stream.

2. The method of claim 1, wherein at a particular time the strata that comprise the processed sub-stream are concurrently applied to one transmit antenna.

3. The method of claim 1, wherein the transmitting step comprises transmitting the portion of the processed sub-stream from the start of a signal burst until the end of the signal burst.

4. The method of claim 1, wherein at least one transmit feature of said each stratum of the processed sub-stream is different from transmit features of the other strata of the processed sub-stream.

5. The method of claim 4, wherein the transmit feature is bit rate.

6. The method of claim 4, wherein the transmit feature is power level.

7. The method of claim 1, further comprising the steps of:
   dividing the one sub-stream into plurality of sub-stream components;
   encoding and modulating each sub-stream component to obtain the strata of the processed sub-stream; and
   combining the strata to form the processed sub-stream.

8. The method of claim 1, wherein the processed sub-stream complies with a CDMA standard.

9. The method of claim 1, wherein the processed sub-stream complies with a OFDM standard.

10. A method for use in a system that is adapted to communicate a primitive data stream, the primitive data stream including a plurality of sub-streams each including a respective plurality of sub-component data streams, the method comprising the step of:
    transmitting at least a portion of each of a plurality of processed sub-streams,
    each one of the processed sub-streams representing a respective one of the sub-streams,
    each processed sub-stream including a plurality of strata,
    each stratum of each processed sub-stream representing a respective one of the sub-stream-components of one of the component data streams represented by that processed sub-stream.

11. The method of claim 10, wherein:
    the system is a multiple output system having at least two transmit antennas; and
    at a particular point in time each of the processed sub-streams is applied to a respective one of the transmit antennas.

12. The method of claim 10, wherein:
    the system is a multiple output system having at least two transmit antennas; and
    the transmission of the processed sub-streams is started concurrently on the at least two transmit antennas.

13. The method of claim 10, wherein the transmitting step comprises transmitting the portion of the processed sub-stream from the start of a signal burst until the end of the signal burst.

14. The method of claim 10, wherein at least one transmit feature of said each stratum of one of the processed sub-streams is different from transmit features of the other strata of the one processed sub-stream.

15. The method of claim 14, wherein the transmit feature is bit rate.

16. The method of claim 14, wherein the transmit feature is power level.

17. The method of claim 10, further comprising the steps of:
    dividing each sub-stream into a respective plurality of sub-stream-components;
    encoding and modulating each sub-stream component to obtain the strata; and
    combining the strata representing one of the pluralities of sub-stream-components to form one of the processed sub-streams.

18. The method of claim 10, wherein the processed sub-stream complies with a CDMA standard.

19. The method of claim 10, wherein the processed sub-stream complies with a OFDM standard.

20. A method for processing a received signal that includes at least a portion of at least one processed sub-stream, each processed sub-stream representing a respective one of a plurality of sub-streams, each sub-stream including a respective plurality of sub-stream-components, each processed sub-stream including a plurality of strata, each stratum of each processed sub-stream representing a respective one of the plurality of sub-stream-components of the particular sub-stream represented by that particular processed sub-stream, the method comprising the steps of:
    (a) decoding at least a portion of one of the strata to obtain at least a portion of a respective sub-stream component, the decoding step further comprising separating out and decoding the portion of the stratum to obtain the sub-stream component portion;
    (b) removing the decoded portion of the one stratum from the received signal, the removing step further comprising re-encoding the decoded portion to obtain the one stratum and subtracting the re-encoded stratum from the received signal; and
    (c) decoding at least a portion of another of the strata to obtain at least a portion of a respective sub-stream component.

21. The method of claim 20, further comprising the steps of:
    (d) removing the decoded portion of the other stratum from the received signal; and
    (e) repeating decoding step (c) and removing step (d) until all of the sub-stream-components represented by the strata in the received signal are decoded.

22. The method of claim 20, wherein:
    the stratum decoded in decoding step (a) is portion of a first processed sub-stream;
    the stratum decoded in decoding step (c) is portion of the first processed sub-stream after the decoded portion of the one stratum has been removed in step (b); and
    the signal comprises at least two processed sub-streams; and the method further comprising the steps of:
    (f) decoding at least a portion of one of the strata that is part of another processed sub-stream;
    (g) decoding at least a. portion of another of the strata that is part of the other processed sub-stream.

23. The method of claim 22, wherein:
    decoding step (f) occurs concurrently with decoding step (a); and decoding step (g) occurs concurrently with decoding step (c).

24. The method of claim 22, wherein decoding steps (f) and (g) occur after decoding step (c).

25. The method of claim 22, wherein:
at least one transmit feature of said each stratum of one of the processed sub-streams is different from transmit features of the other strata of the one processed sub-stream;
the transmit features of the stratum decoded in decoding step (a) are the same as the transmit features of the stratum decoded in decoding step (f); and
the transmit features of the stratum decoded in decoding step (c) are the same as the transmit features of the stratum decoded in decoding step (g).

26. The method of claim 20, wherein at least one transmit feature of said each stratum of one of the processed sub-streams is different from transmit features of the other strata of the one processed sub-stream.

27. The method of claim 26, wherein:
the transmit feature comprises a bit rate;
the stratum decoded in decoding step (a) having a bit rate that is lower then the bit rate of the other strata that are part of the same one of s the processed sub-streams; and
the stratum decoded in decoding step (c) having a higher bit rate than the bit rate of the stratum decoded in decoding step (a).

28. The method of claim 26, wherein:
the transmit feature comprises a power level;
the stratum decoded in decoding step (a) having a power level that is higher than the power level of the other strata that are part of the same one of the processed sub-streams; and
the stratum decoded in decoding step (c) having a lower power level than the power level of the stratum decoded in decoding step (a).

29. A transmitter for use in a system adapted to communicate at least a portion of a primitive data stream, the primitive data stream including a plurality of sub-streams, the transmitter comprising:
a first stratifier that stratifies one of the component data streams into a processed sub-stream,
the processed sub-stream component having a plurality of strata,
each stratum of the processed sub-stream representing a respective one of a plurality of sub-stream components of the one sub-stream.

30. The transmitter of claim 29, wherein the first stratifier comprises:
a demultiplexer having an input that receives the sub-stream and a plurality of outputs each for outputting one of the of sub-stream-components;
a plurality of encoder/modulators each having an input coupled to one of the outputs of the demultiplexer, each encoder/modulator encodes and modulates at least a respective one of the sub-stream-components to obtain its respective stratum; and
a combiner having a plurality of inputs each coupled to an output of one of the encoder/modulators and an output for outputting the processed sub-stream.

31. The transmitter of claim 30, wherein:
a bit rate of each stratum of the processed sub-stream is different from bit rates of the other strata of the processed sub-stream;
the demultiplexer is a variable rate demultiplexer.

32. The transmitter of claim 30, wherein:
a power level of each stratum of the particular processed sub-stream is different from power levels of the other strata of the particular processed sub-stream; and
each of the encoder/modulators is operable to produce the strata such that the power level of each stratum of the particular processed sub-stream is different from the power levels of the other strata of the particular processed sub-stream.

33. The transmitter of claim 29, wherein the transmitter further comprises:
a primary signal demultiplexer having an input for receiving the primary signal and a plurality of outputs each for outputting one of the sub-streams;
a further plurality of stratifiers, each stratifer capable of stratifying at least one of the component data streams into a respective processed sub-stream, each stratum of one of the processed sub-streams representing a respective one of a plurality of sub-stream-components of the respective sub-stream of the one processed sub-stream.

34. The transmitter of claim 29, wherein at least one transmit feature of each stratum of the processed sub-stream is different from transmit features of the other strata of the processed sub-stream.

35. The transmitter of claim 29, wherein the transmitter is part of a base station of a wireless communication system.

36. The base station of claim 35, wherein the base station has a plurality of transmit antennas.

37. The transmitter of claim 29, wherein the transmitter is part of a terminal.

38. The wireless communication system of claim 35, wherein the wireless communication system is a CDMA system.

39. The wireless communication system of claim 35, wherein the wireless communication system is a OFDM system.

40. A receiver comprising:
at least one receive antenna each receive antenna having an output for outputting a receive antenna signal, each receive antenna signal including at least a portion of at least one processed sub-stream, each s processed sub-stream representing a respective sub-stream, each processed sub-stream including a plurality of strata, each stratum of each processed sub-stream representing a respective one of a plurality of sub-stream-components of the respective sub-streams of the processed sub-stream;
a processor having an input coupled to the outputs of the receive antennas, the processor operable to receive a signal from the receive antenna signals, and comprising:
a strata processor operable to decode at least a portion of one of the strata by separating out and decoding the portion to obtain at least a portion of a respective sub-stream component;
an encoder/modulator operable to remove the decoded portion of the stratum from the receive signal and to re-encode the decoded sub-stream component to obtain the respective stratum; and
a combiner for subtracting any re-encoded stratum from the received signal,
the processor further operable to decode at least a portion of another of the strata to obtain at least a portion of a respective sub-stream component.

41. The receiver of claim 40, wherein the processor is further adapted to:
 remove the decoded portion of the other stratum from the receive signal; and
 repeat the removing and the decoding of at least a portion of another stratum until all sub-stream-components represented by the strata in the received signal are decoded.

42. The receiver of claim 40, wherein processor is adapted to decode the strata of a first and a second processed sub-stream concurrently.

43. The receiver of claim 42, wherein:
 at least one transmit feature of each stratum of one processed sub-stream is different from transmit features of the other strata of the same one processed sub-stream;
 the strata decoded concurrently have the same transmit features.

44. The receiver of claim 40, wherein processor is adapted to decode the strata of a second processed sub-stream after decoding the strata of a first processed sub-stream.

45. The receiver of claim 40, wherein at least one transmit feature of each stratum of one processed sub-stream is different from transmit features of the other strata of the same one processed sub-stream.

46. The receiver of claim 45, wherein the transmit feature comprises a bit rate.

47. The receiver of claim 45, wherein the transmit feature comprises a power level.

48. The receiver of claim 40, wherein the receiver is part of a base station of a wireless communication system.

49. The receiver of claim 40, wherein the receiver is part of a terminal.

50. The wireless communication system of claim 48, wherein the wireless communication system is a CDMA system.

51. The wireless communication system of claim 48, wherein the wireless communication system is a OFDM system.

* * * * *